US009726862B2

United States Patent
Hou et al.

(10) Patent No.: US 9,726,862 B2
(45) Date of Patent: Aug. 8, 2017

(54) LENS ASSEMBLIES AND ACTUATORS FOR OPTICAL SYSTEMS AND METHODS THEREFOR

(71) Applicant: DYNAOPTICS PTE LTD, A SINGAPORE PRIVATE LIMITED COMPANY, Singapore (SG)

(72) Inventors: Chang Lun Hou, Singapore (CN); Koon Lin Cheo, Singapore (SG); Ming Chou Lin, Singapore (SG); Yung Yuan Kao, Singapore (TW)

(73) Assignee: DynaOptics LTD, A Public Limited CO., Singapore (SG)

( * ) Notice: Subject to any disclaimer, the term of this patent is extended or adjusted under 35 U.S.C. 154(b) by 0 days.

(21) Appl. No.: 14/708,171

(22) PCT Filed: Jan. 8, 2015

(86) PCT No.: PCT/IB2015/000409
§ 371 (c)(1),
(2) Date: May 8, 2015

(87) PCT Pub. No.: WO2015/110916
PCT Pub. Date: Jul. 30, 2015

(65) Prior Publication Data
US 2016/0018626 A1 Jan. 21, 2016

Related U.S. Application Data

(63) Continuation-in-part of application No. PCT/IB2013/002905, filed on Nov. 8, 2013.
(Continued)

(51) Int. Cl.
G02B 13/00 (2006.01)
G02B 15/16 (2006.01)
(Continued)

(52) U.S. Cl.
CPC ......... *G02B 13/009* (2013.01); *G02B 3/0081* (2013.01); *G02B 7/005* (2013.01);
(Continued)

(58) Field of Classification Search
CPC .... G02B 15/16; G02B 15/161; G02B 13/009; G02B 13/002; G02B 13/004;
(Continued)

(56) References Cited

U.S. PATENT DOCUMENTS 3,469,516 A  9/1969  Mayr
3,507,565 A  4/1970  Alvarez et al.
(Continued)

FOREIGN PATENT DOCUMENTS

GB  1099026  1/1968
WO  WO2008064859  6/2008

*Primary Examiner* — Jordan Schwartz
(74) *Attorney, Agent, or Firm* — James E. Eakin

(57) ABSTRACT

An optical zoom in a small form factor suitable for use in mobile devices such as cell phones, security cameras, and other small-scale imaging systems. One or more Alvarez lens pairs are provided, and moved transversely to the optical axis. The combination of one or more Alvarez lens pairs and the actuator permits a zoom power of at least 3× with a lateral displacement distance of the optical components of approximately five millimeters or less.

1 Claim, 43 Drawing Sheets

200 Free-form Lens Housing Cover
205 Free-form Pair 1 cover
210 Free-form lens 1 sub-assembly (comprising Lens 1, molded arm, lens frame and VCM Coil)
215 Free-form Pair 1 guide frame
220 Free-form lens 2 sub-assembly (comprising Lens 2 (with prism), molded arm, lens frame and VCM Coil)
225 Free Form Lens Pair 01 Base
230 Free-form lens 3 sub-assembly (comprising Lens 3, molded arm, and lens frame)
235 Free-form Pair 2 guide frame
240 Free-form lens 4 sub-assembly (comprising Lens 4, molded arm, and lens frame)
245 VCM Magnet Groups
250 Magnet Assembly (Shield with Magnet)
255 Free-form Lens Housing Cover
260 Extension
265 Slot
270 Extension
275 Slot 255 Optical Zoom Group and Actuator Assembly

Related U.S. Application Data

(60) Provisional application No. 61/925,215, filed on Jan. 8, 2014, provisional application No. 61/874,333, filed on Sep. 5, 2013, provisional application No. 61/724,221, filed on Nov. 8, 2012.

(51) Int. Cl.

| | | |
|---|---|---|
| *G02B 7/00* | (2006.01) | |
| *G02B 7/04* | (2006.01) | |
| *G02B 7/02* | (2006.01) | |
| *G02B 15/177* | (2006.01) | |
| *G02B 3/00* | (2006.01) | |
| *G02B 7/10* | (2006.01) | |

(52) U.S. Cl.
CPC ............... *G02B 7/026* (2013.01); *G02B 7/04* (2013.01); *G02B 13/004* (2013.01); *G02B 13/007* (2013.01); *G02B 13/0045* (2013.01); *G02B 13/0065* (2013.01); *G02B 13/0075* (2013.01); *G02B 13/0085* (2013.01); *G02B 15/16* (2013.01); *G02B 15/177* (2013.01); *G02B 7/102* (2013.01)

(58) Field of Classification Search
CPC ............ G02B 13/0045; G02B 13/0055; G02B 13/0075; G02B 15/177; G02B 3/0081; G02B 7/04
See application file for complete search history.

(56) References Cited

U.S. PATENT DOCUMENTS

| | | |
|---|---|---|
| 4,925,281 A | 5/1990 | Baker |
| 5,067,802 A | 11/1991 | Orino |
| 5,392,159 A | 2/1995 | Sasaki et al. |
| 5,717,752 A | 2/1998 | Whitney |
| 6,137,958 A | 10/2000 | Toyoda |
| 7,149,307 B2 | 12/2006 | Puharinen et al. |
| 7,382,546 B2 | 6/2008 | Konno |
| 7,446,946 B2 | 11/2008 | Yoshida et al. |
| 9,091,839 B2 | 7/2015 | Zhou et al. |
| 9,274,320 B2 | 3/2016 | Zhou et al. |
| 2004/0218246 A1 | 11/2004 | Onuki et al. |
| 2006/0291069 A1* | 12/2006 | Yoshida ................. G02B 15/04 359/676 |
| 2007/0247725 A1* | 10/2007 | Dowski ................. G02B 13/12 359/676 |
| 2008/0192326 A1 | 8/2008 | Mizumaki et al. |
| 2008/0199177 A1 | 8/2008 | Ide |
| 2010/0061073 A1 | 3/2010 | Oldsen et al. |
| 2011/0032615 A1* | 2/2011 | Usui ..................... G02B 27/646 359/554 |
| 2014/0285905 A1* | 9/2014 | Zhou ....................... G03B 5/02 359/696 |

\* cited by examiner

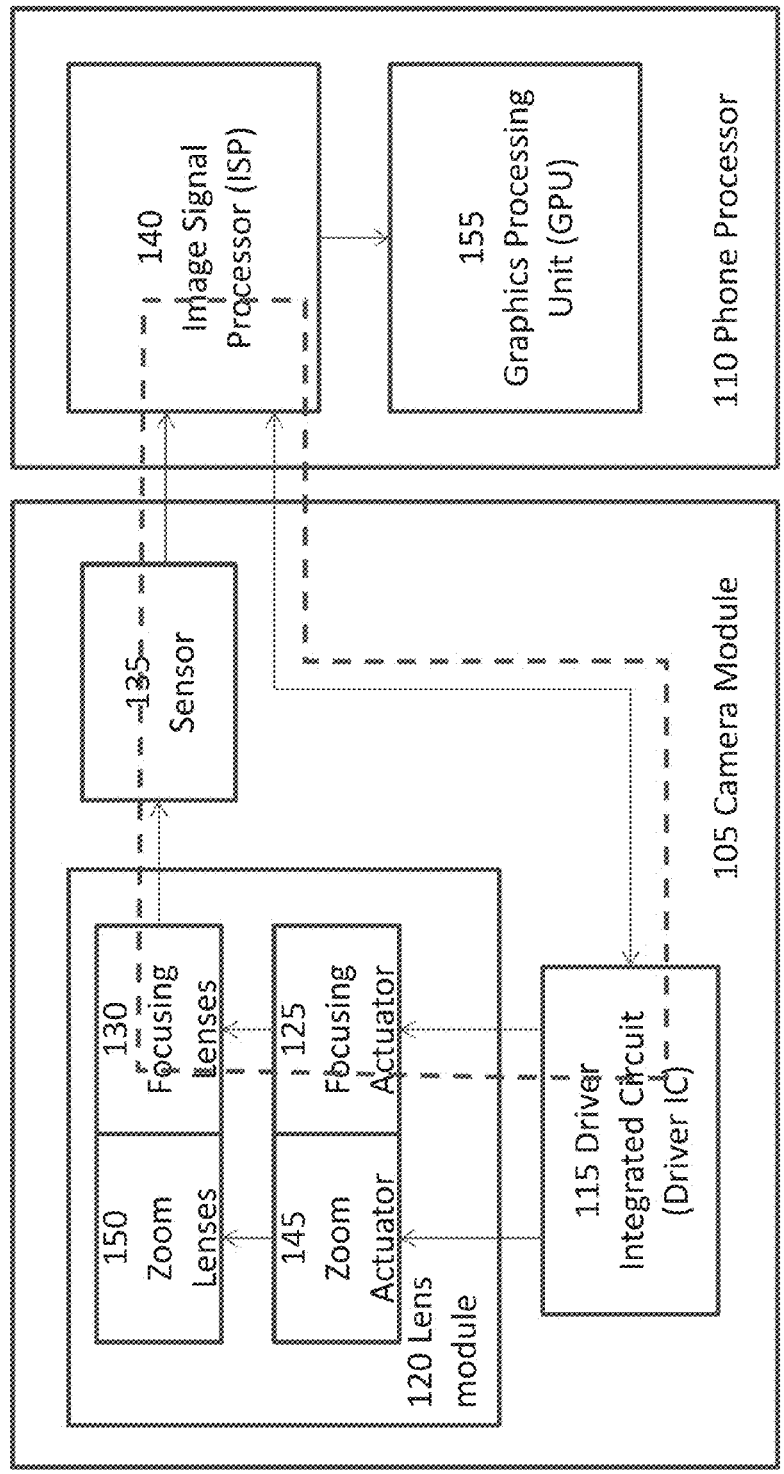
Figure 1 – System Diagram
Dashed red line is the autofocus feedback loop. ISP calculates each image's sharpness, and provides feedback to the Driver IC to adjust focusing lens group.

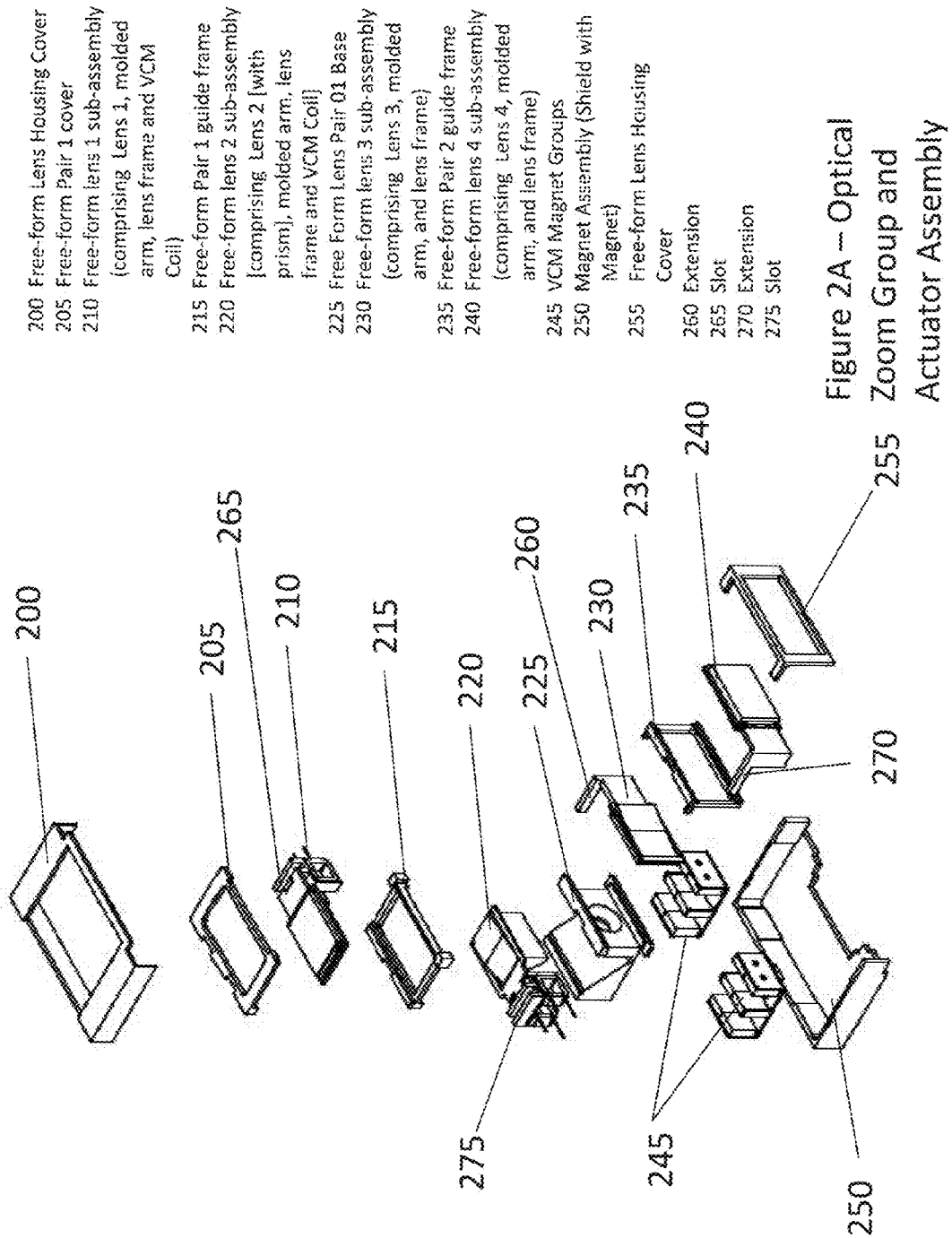

Figure 2A — Optical Zoom Group and Actuator Assembly

200 Free-form Lens Housing Cover
205 Free-form Pair 1 cover
210 Free-form lens 1 sub-assembly (comprising Lens 1, molded arm, lens frame and VCM Coil)
215 Free-form Pair 1 guide frame
220 Free-form lens 2 sub-assembly [comprising Lens 2 (with prism), molded arm, lens frame and VCM Coil]
225 Free Form Lens Pair Q1 Base
230 Free-form lens 3 sub-assembly (comprising Lens 3, molded arm, and lens frame)
235 Free-form Pair 2 guide frame
240 Free-form lens 4 sub-assembly (comprising Lens 4, molded arm, and lens frame)
245 VCM Magnet Groups
250 Magnet Assembly (Shield with Magnet)
255 Free-form Lens Housing Cover
260 Extension
265 Slot
270 Extension
275 Slot

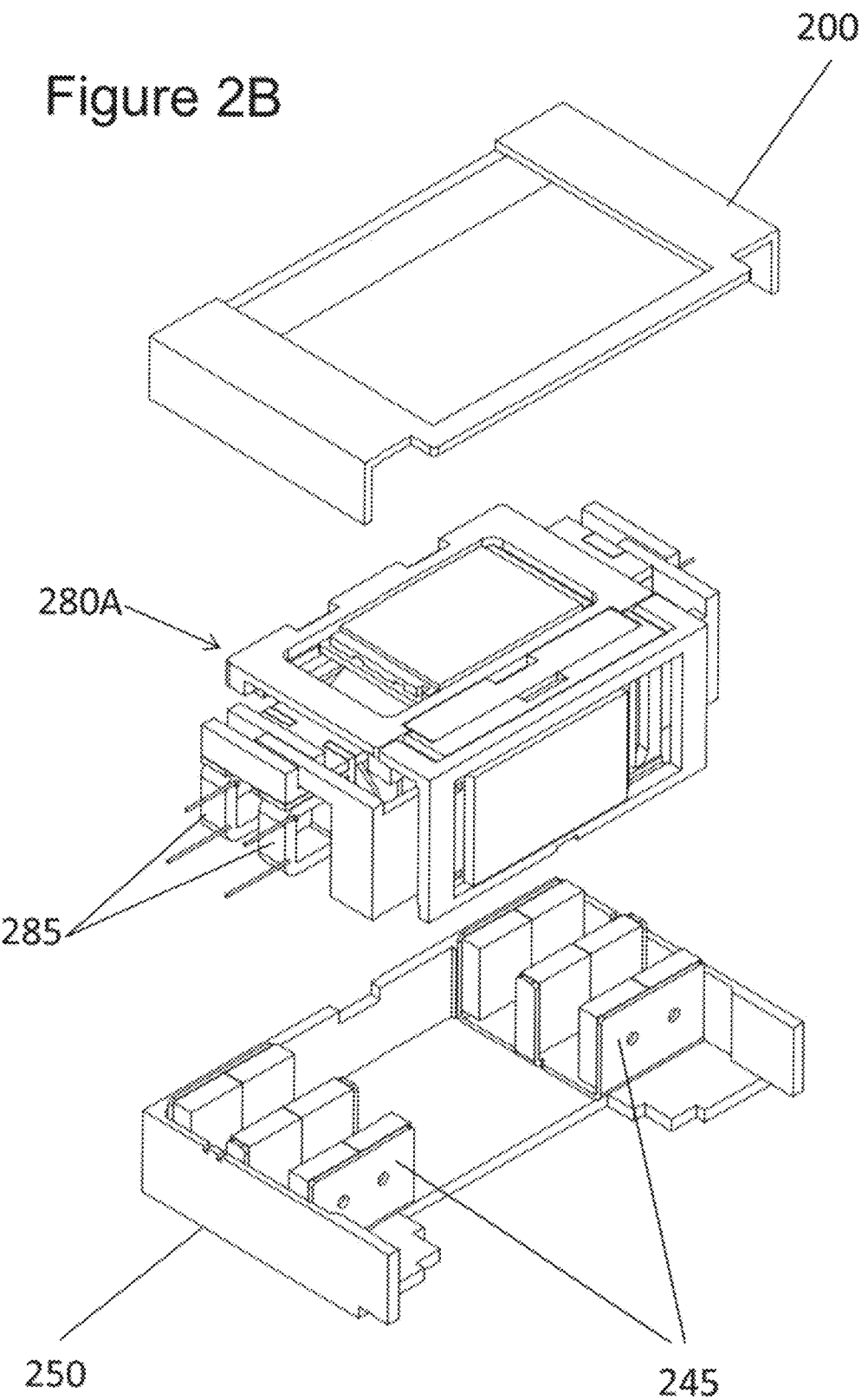

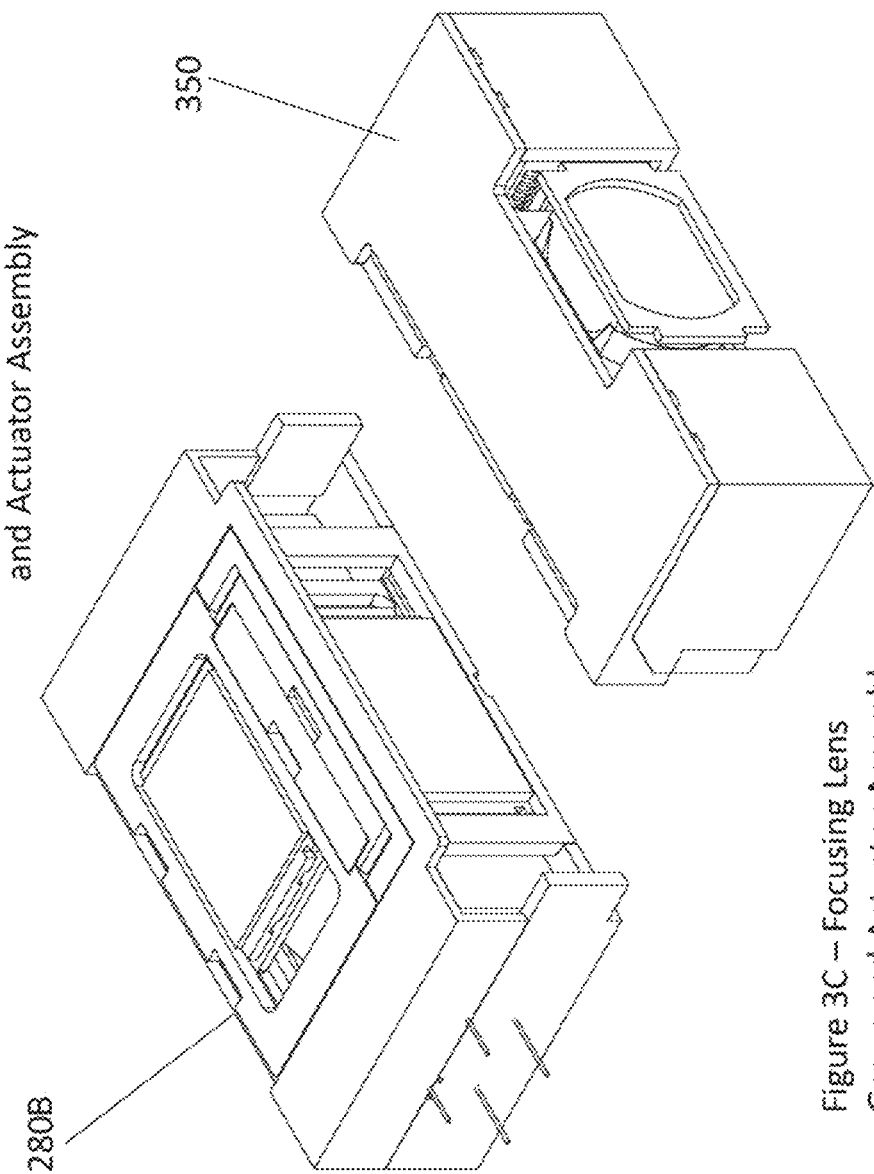

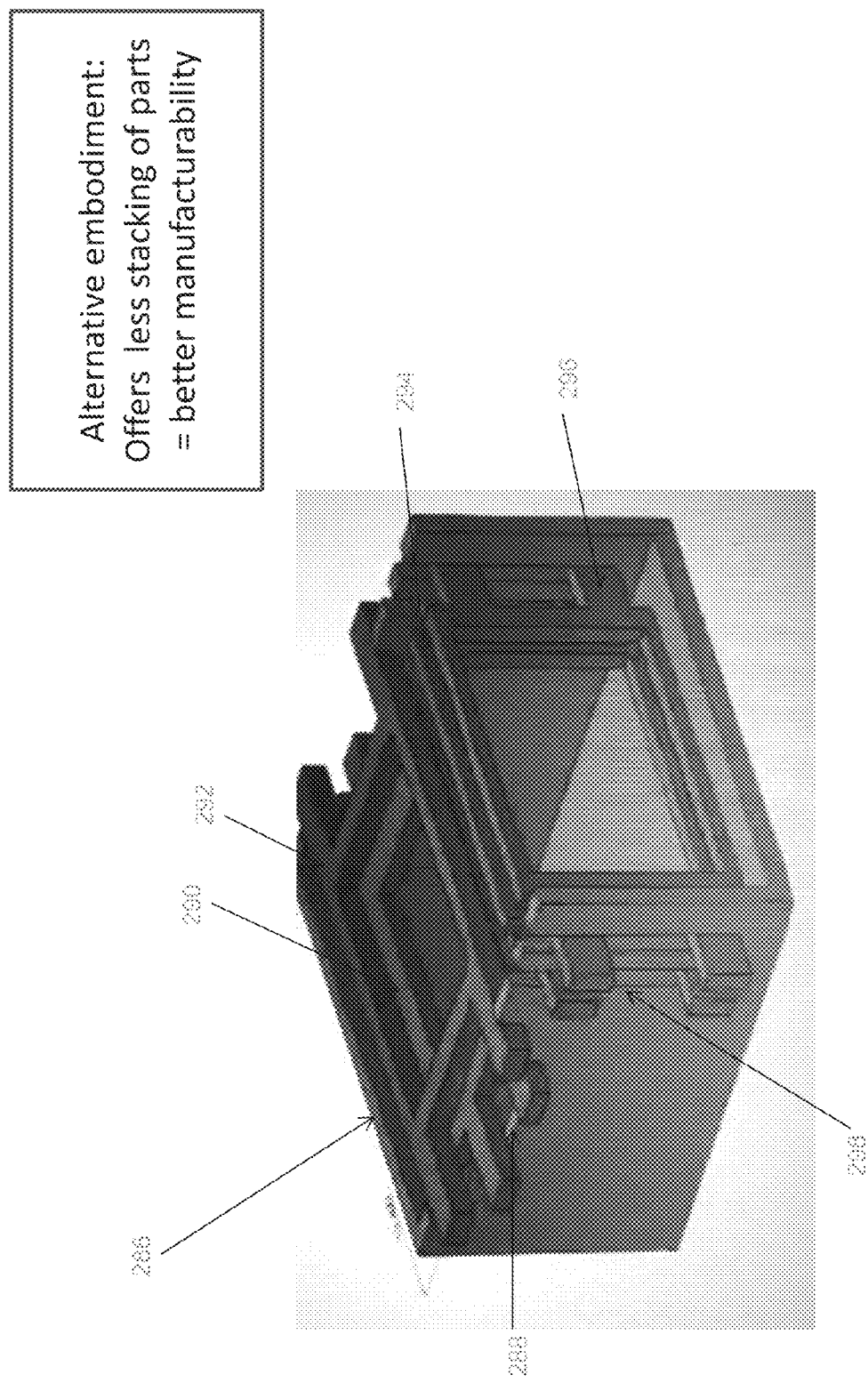
Figure 2D - Integrated Guide Design
Alternative embodiment:
Offers less stacking of parts
= better manufacturability

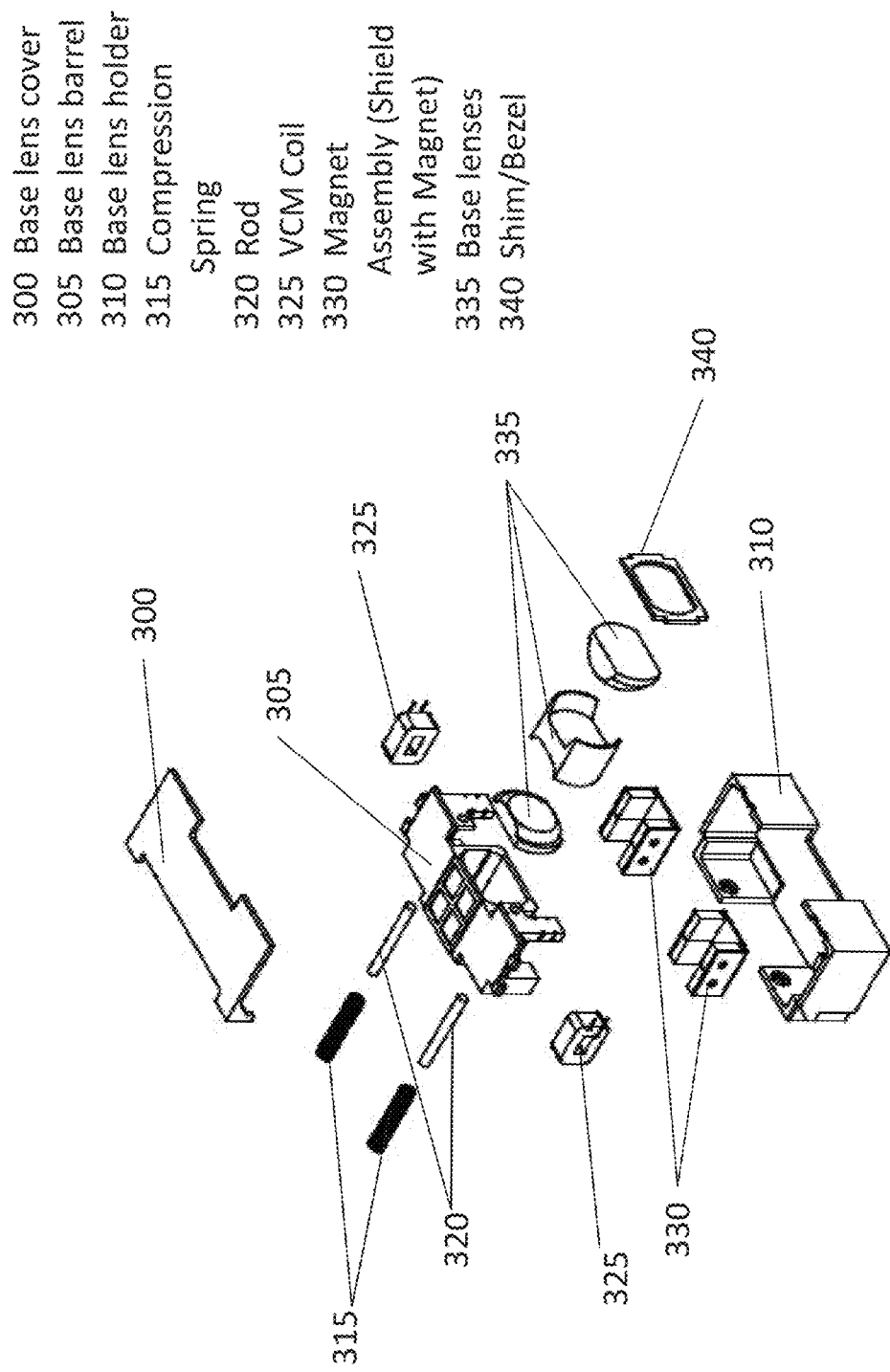
Figure 3A – Focusing Lens Group and Actuator Assembly
300 Base lens cover
305 Base lens barrel
310 Base lens holder
315 Compression Spring
320 Rod
325 VCM Coil
330 Magnet Assembly (Shield with Magnet)
335 Base lenses
340 Shim/Bezel

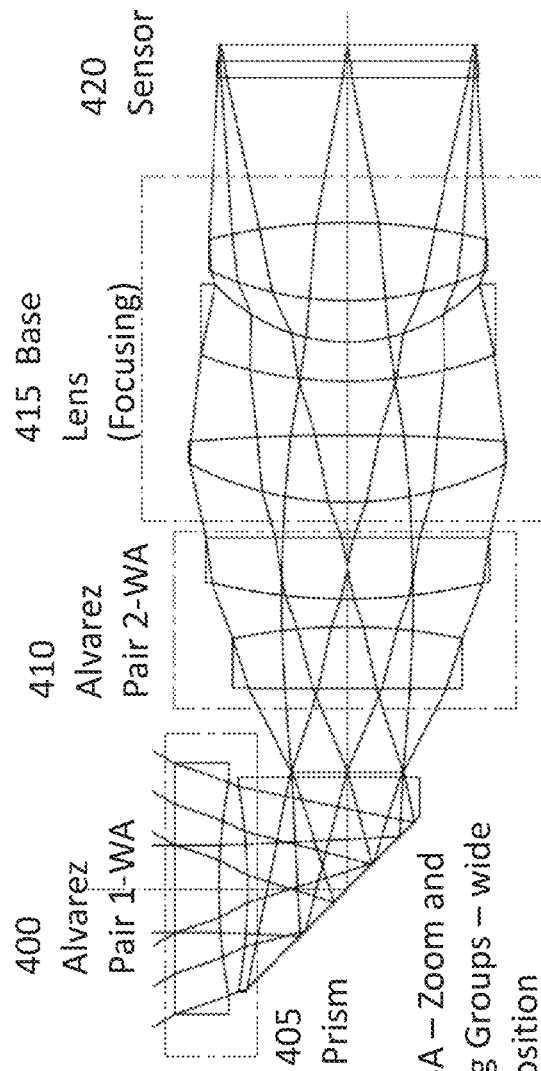
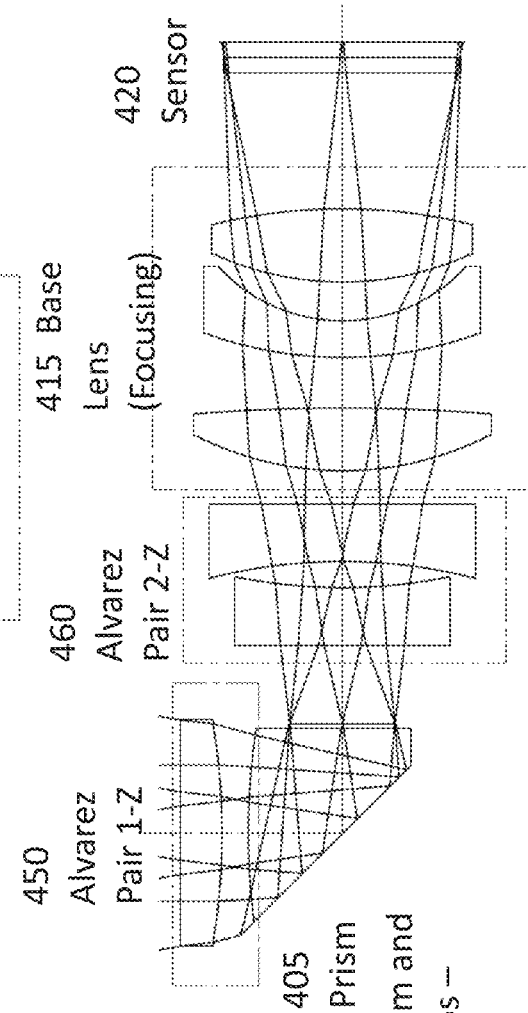
Figure 4A – Zoom and Focusing Groups – wide angle position
Figure 4B – Zoom and Focusing Groups – zoom position

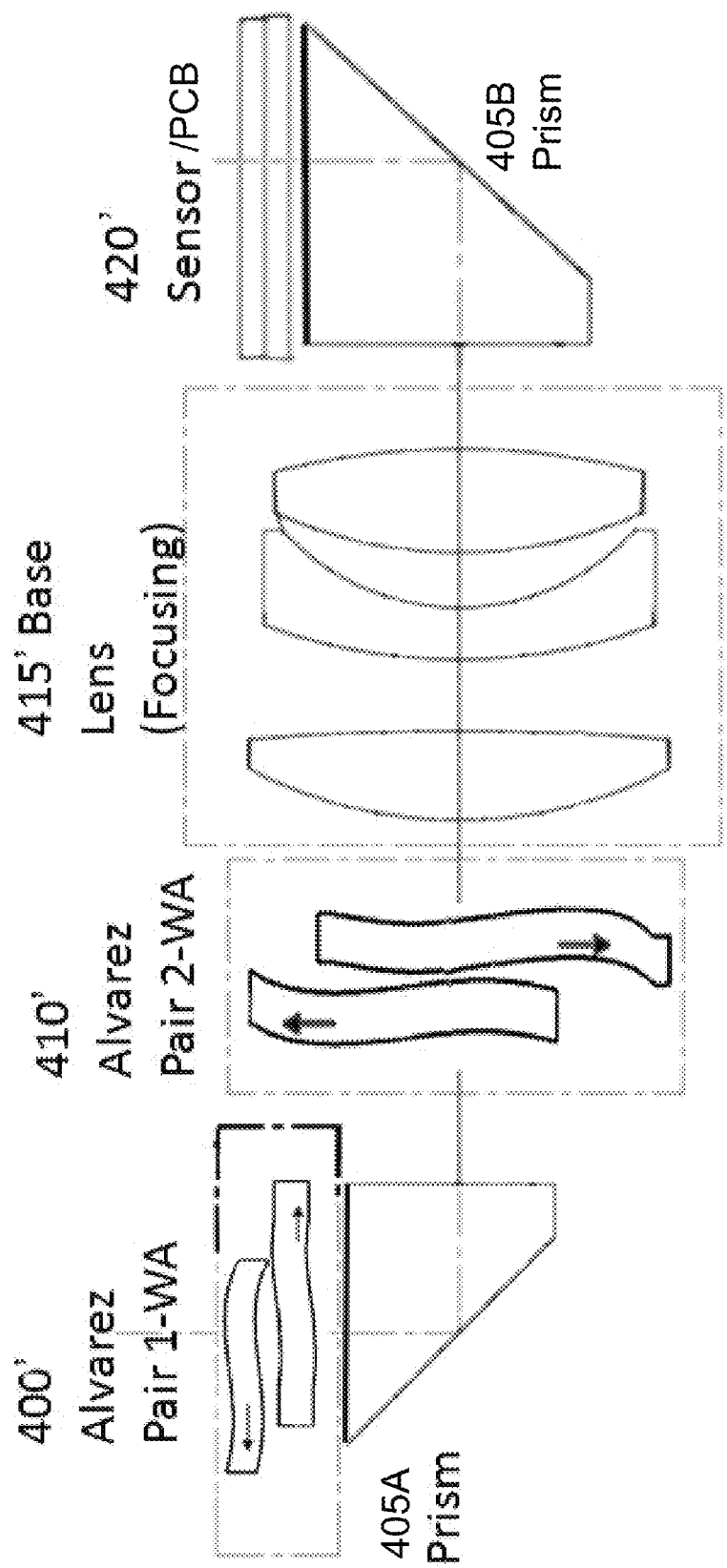
Figure 4E - zoom and focus with freeform surfaces on both sides of the Alvarez pairs

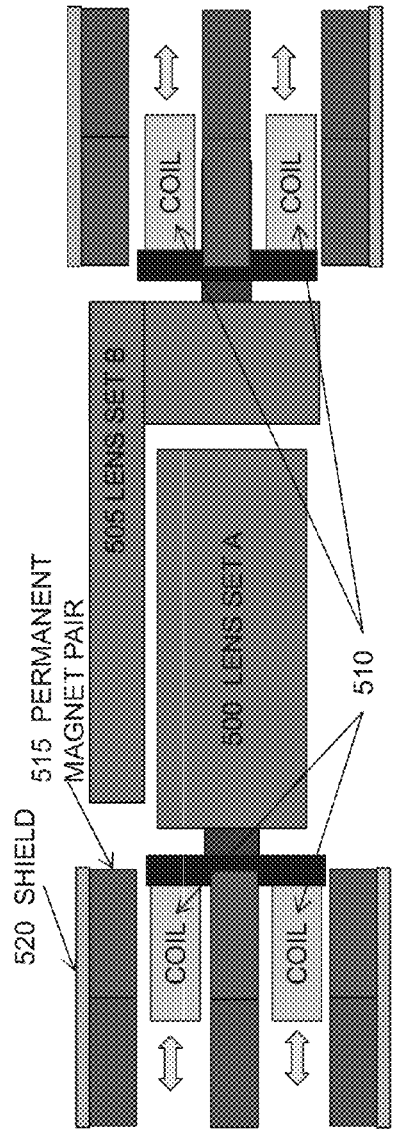

Figure 5 – Dual coil actuators

Dual VCM actuators are provided for each set of mating lens as shown below.

- Dual moving coils for each actuator are adopted instead of single coil to eliminate air gap-vs-turns penalty, thereby maximizing Lorentz force.
- Ferromagnetic shield/housing for magnetic loop closure and to prevent magnetic flux from leaking outside the electromagnetic (EM) space.

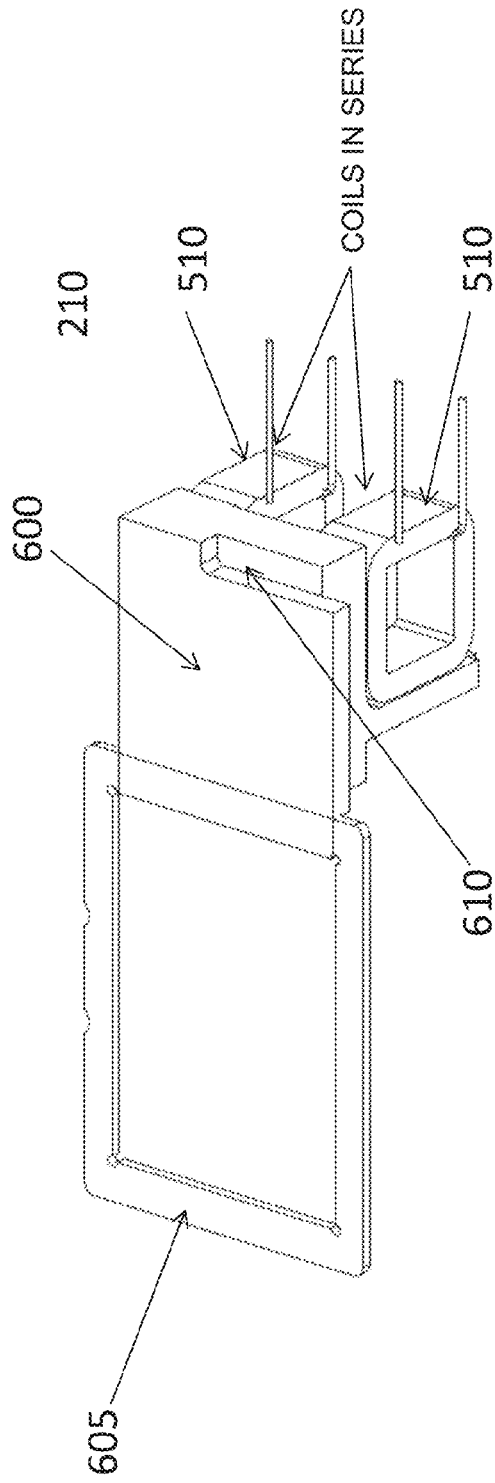
Figure 6 -- Lens holder that holds coils
- Moving armature comprises non-magnetic gripper or window frame to hold the two or more coils by overmolding or adhesives.
- Part armature extends to a frame or support to hold one or more lens elements.
- Integrated frame holds one or more lens elements

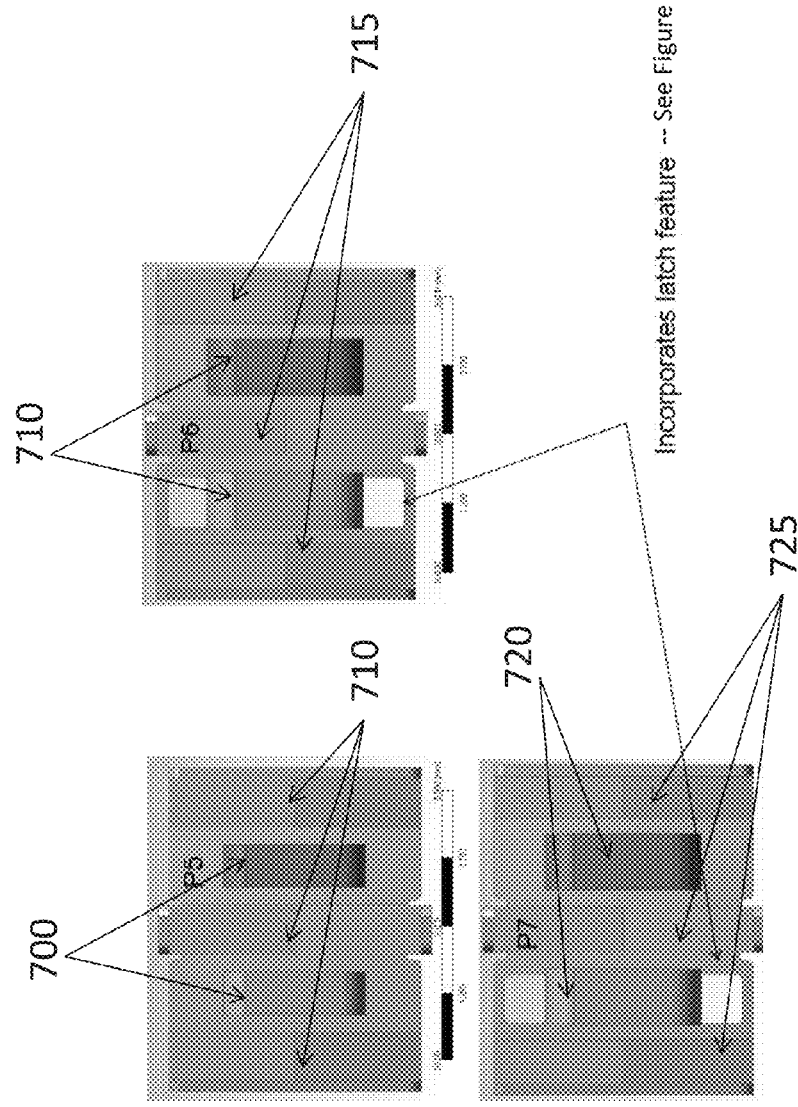
Figure 7 -- Double coil -- lateral to optical axis
force generated is a balance between number of coils and thickness of magnets

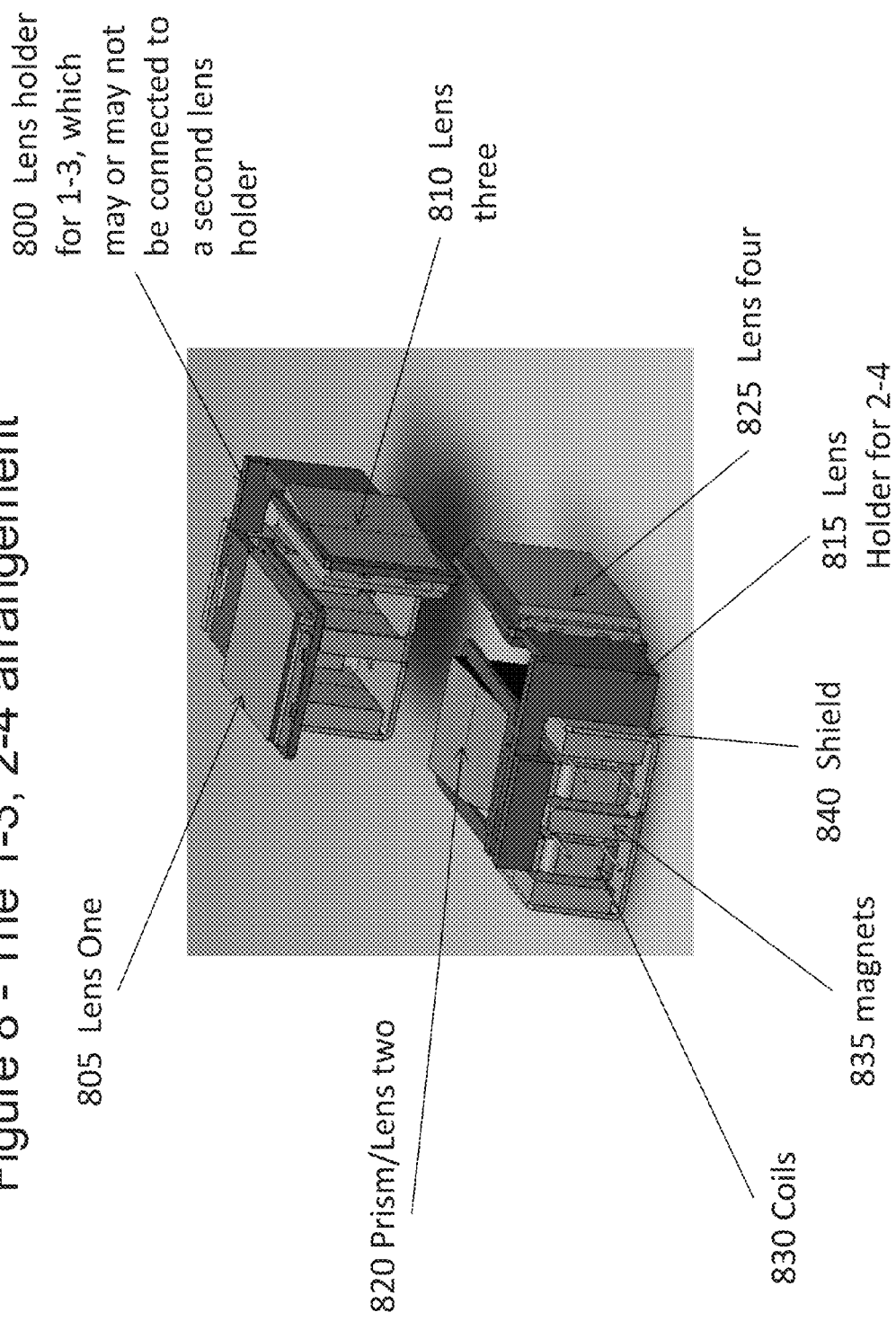
Figure 8 - The 1-3, 2-4 arrangement

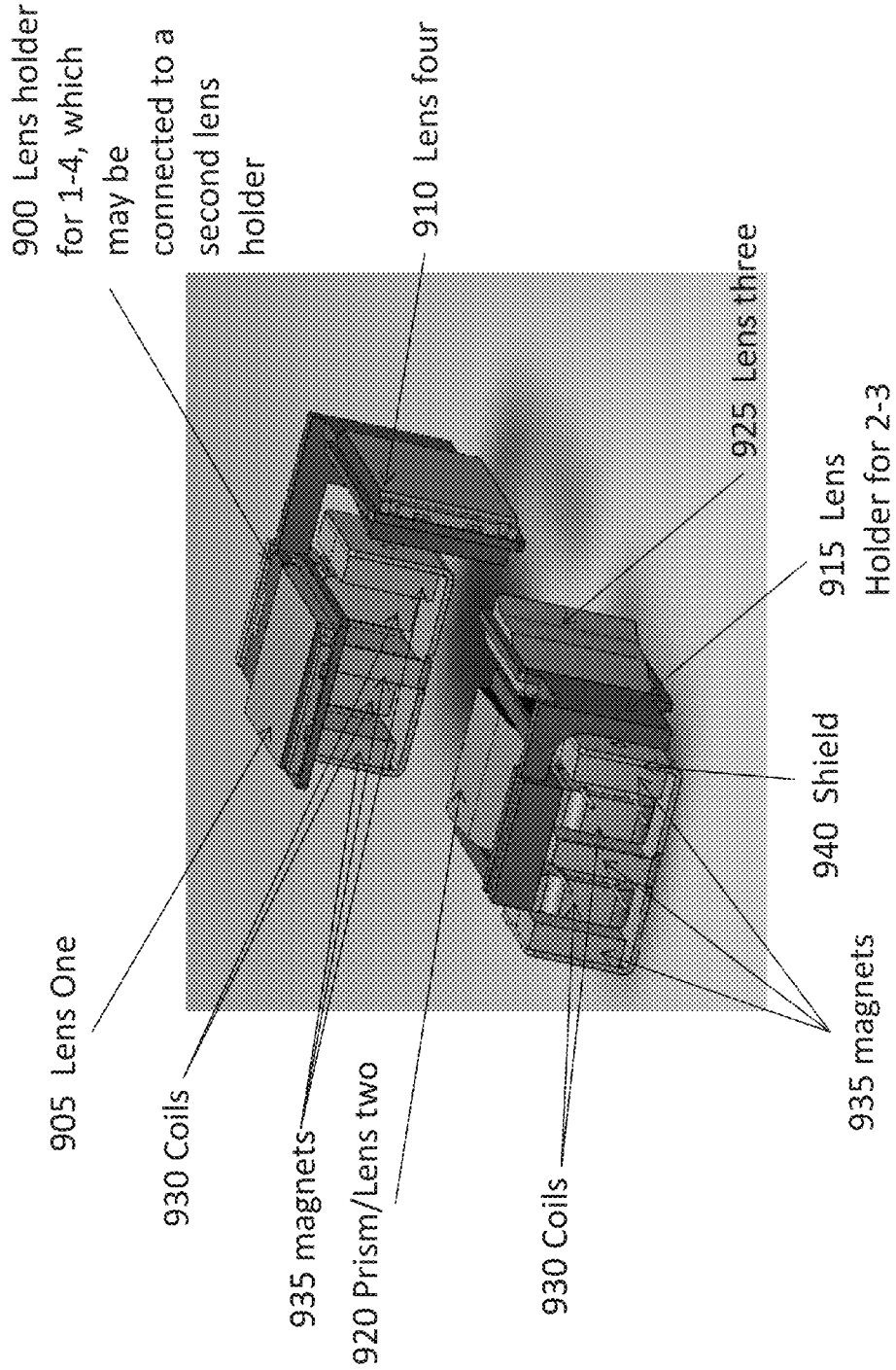
Figure 9 - The 1-4, 2-3 arrangement

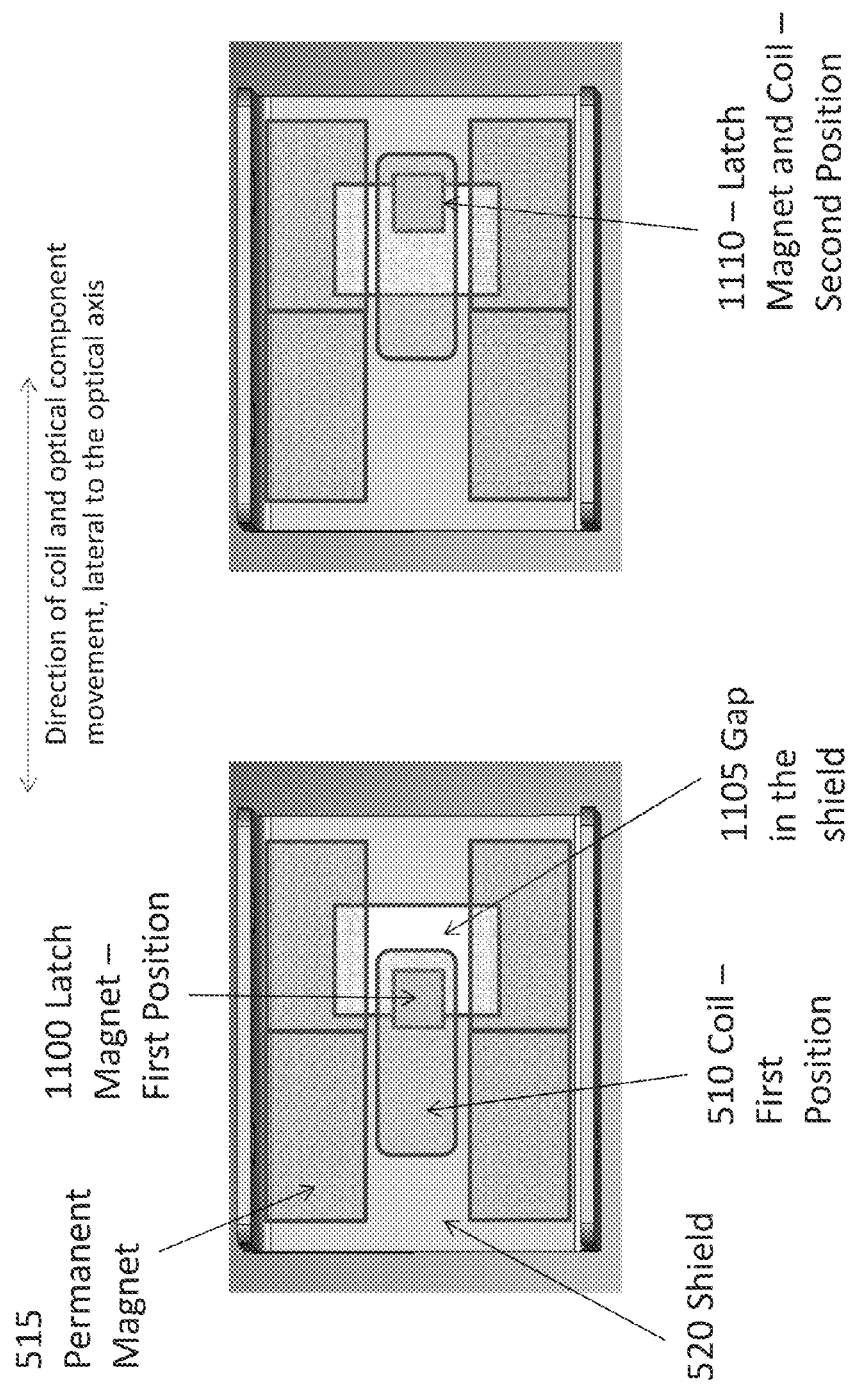
Figure 11 – Top view of the latching mechanism

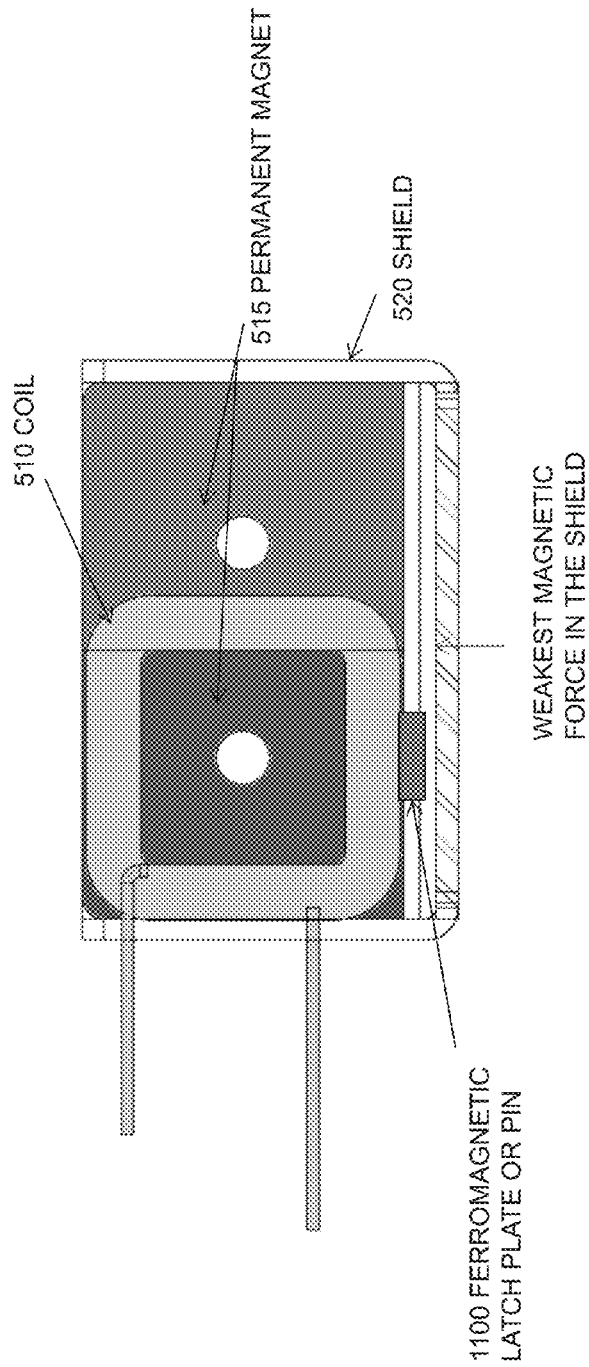

Figure 12 – Side view of latching mechanism

- Ferromagnetic Latch plate (Latch magnet) is attached to the coil.
- Magnetic latch can be for positioning at both extreme ends or for a single side
- Upon shock, an algorithm is triggered to actuate the moving coil back to the latch positions
- In an embodiment, a large initial current is required to move the actuator out of the latch position

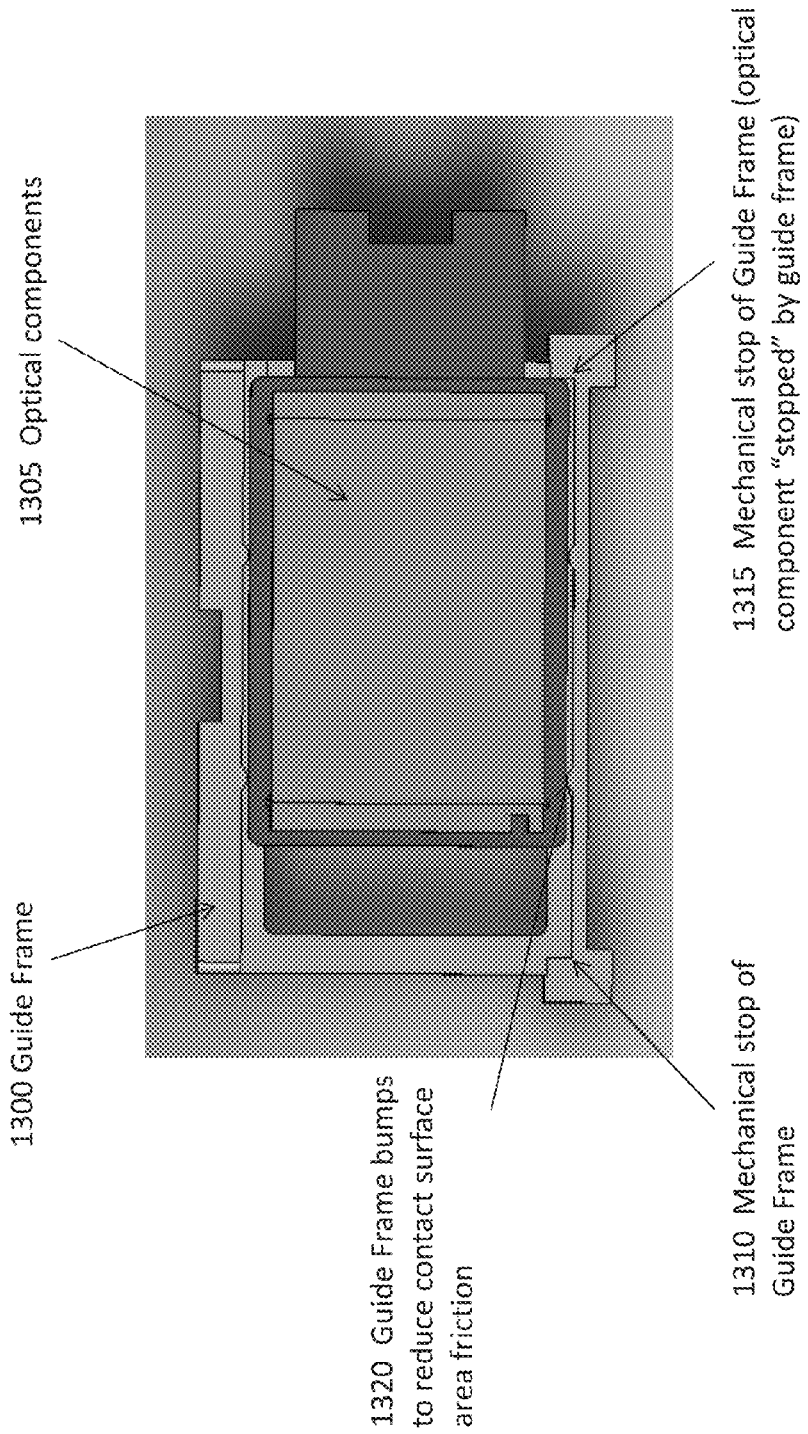
Figure 13 - Mechanical stop for magnetic latch (in 2 positions)

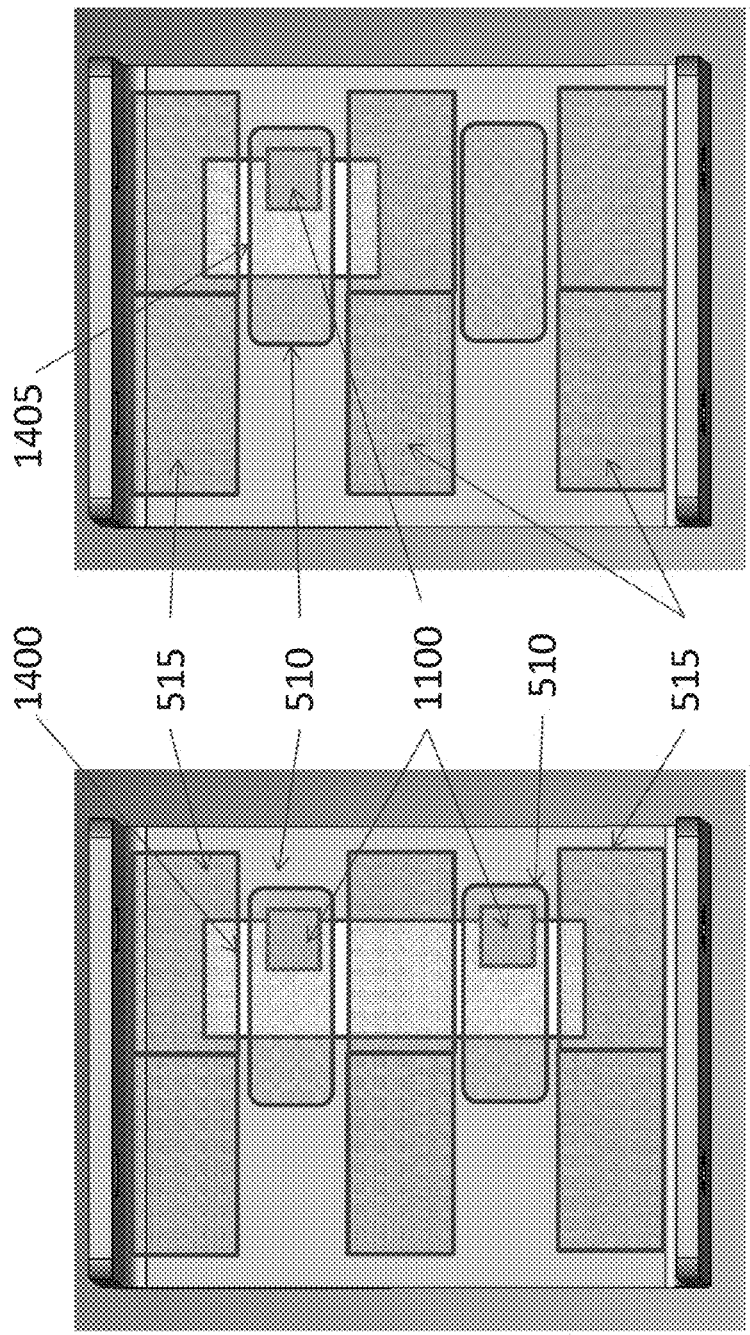
Figures 14A-14B - two different designs for discrete position latch on double coil embodiment

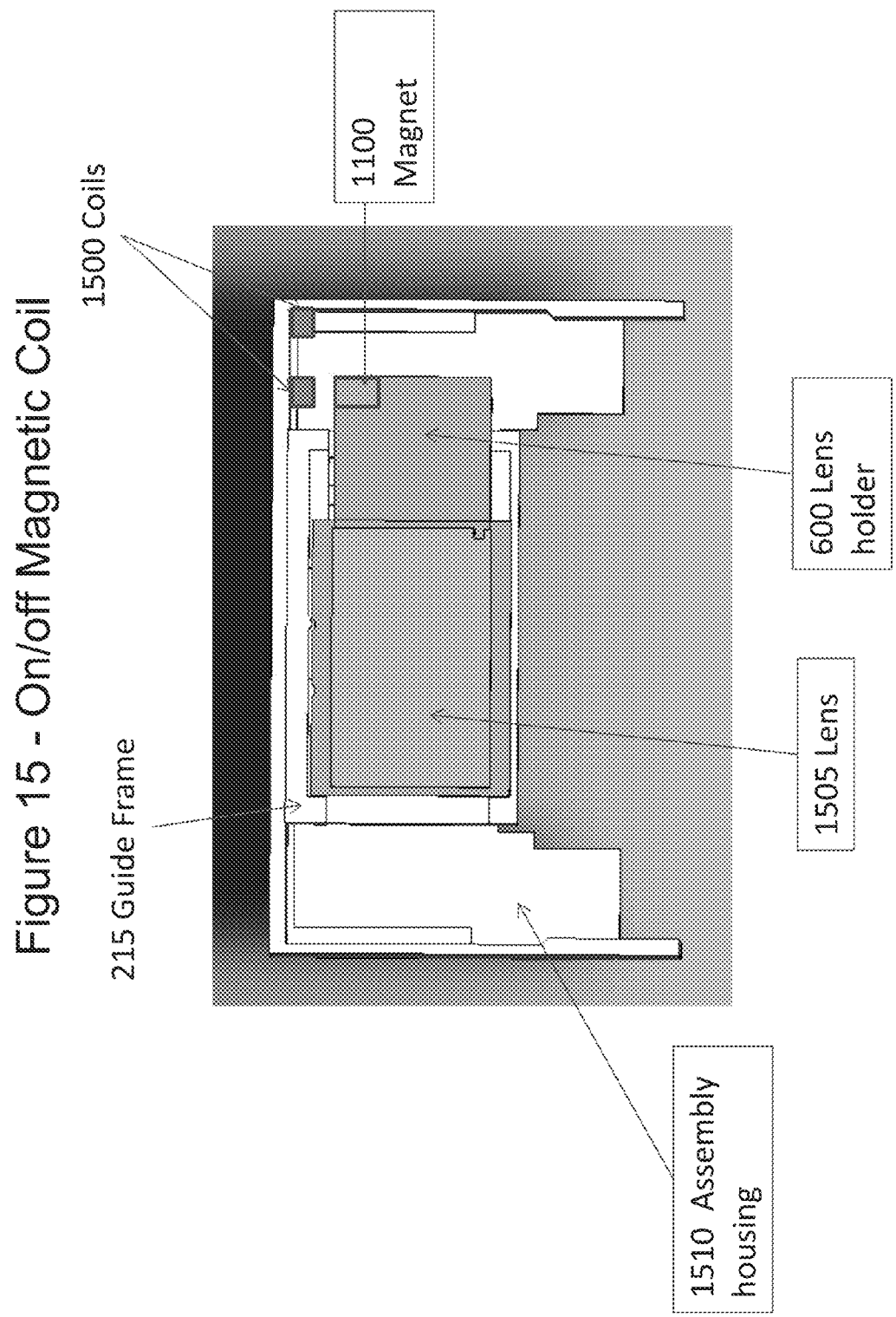

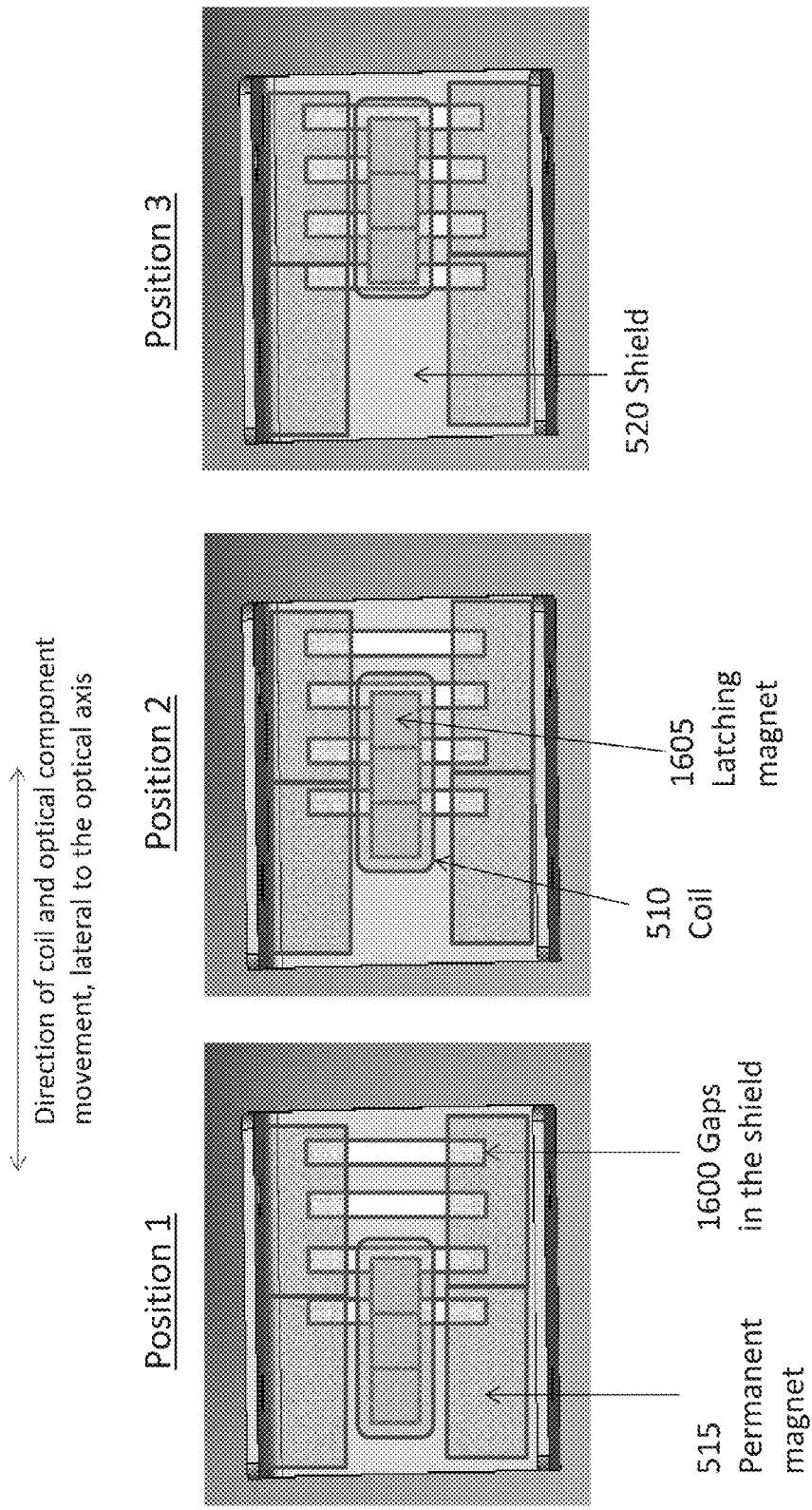

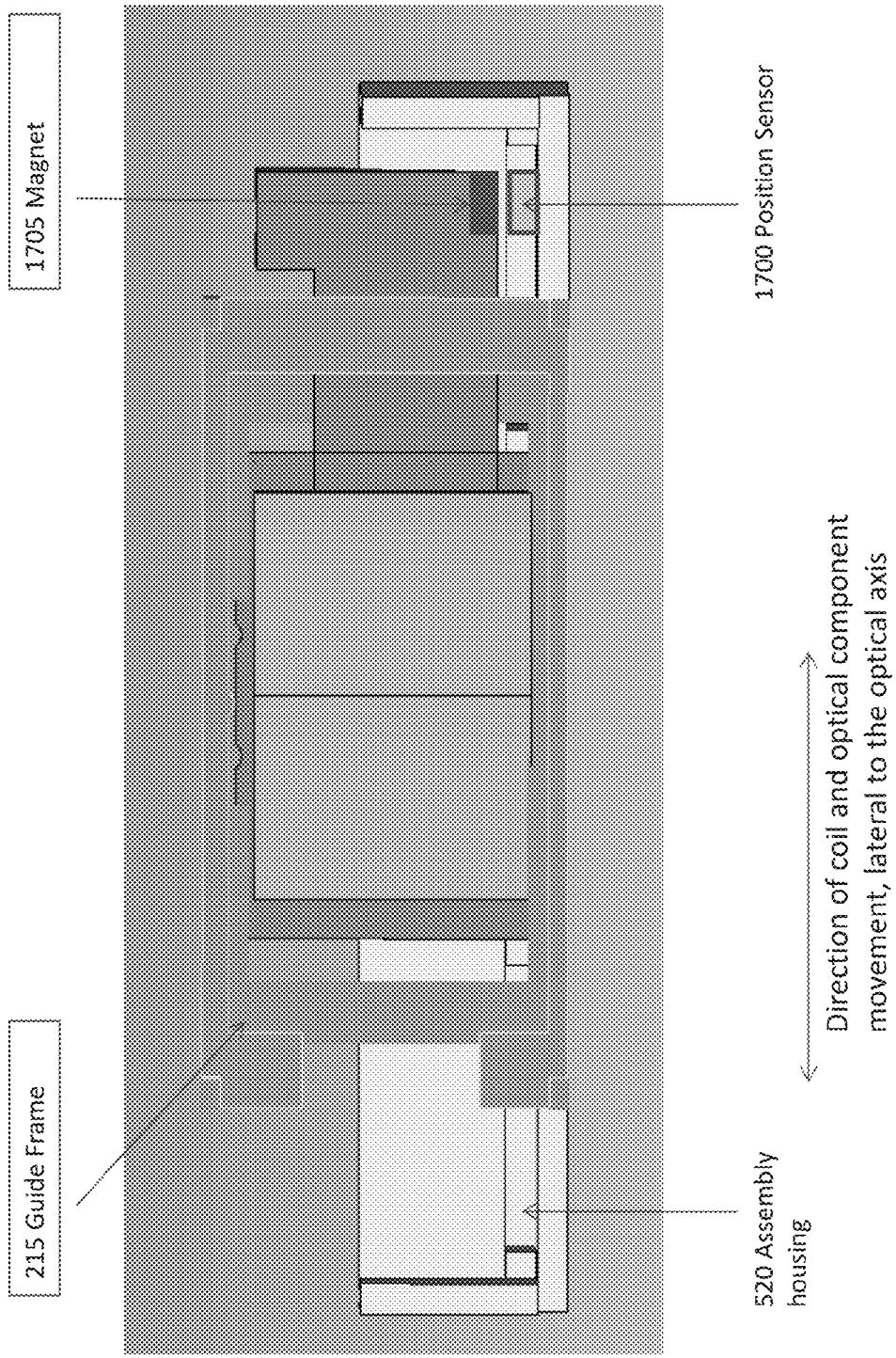

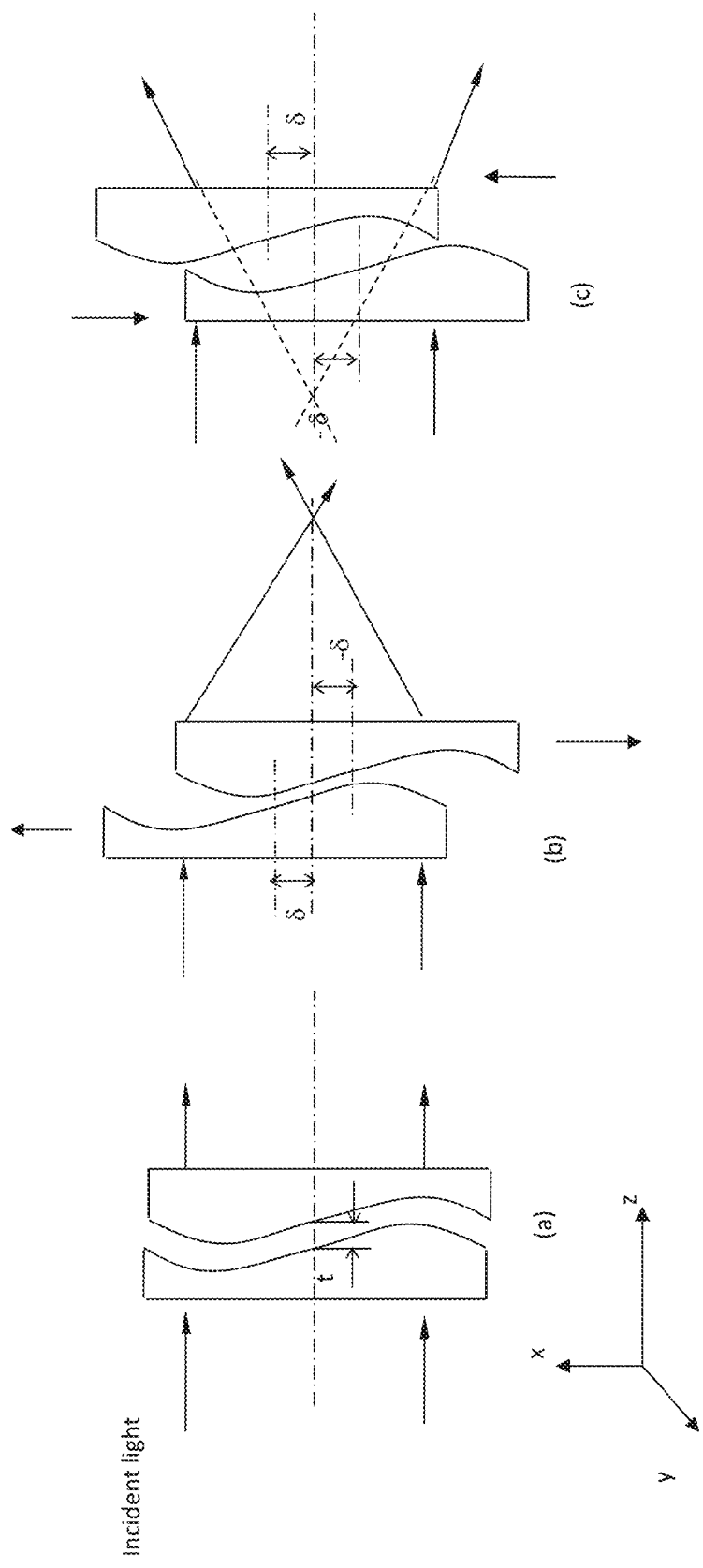
Figure 18 – Model of an Alvarez Lens

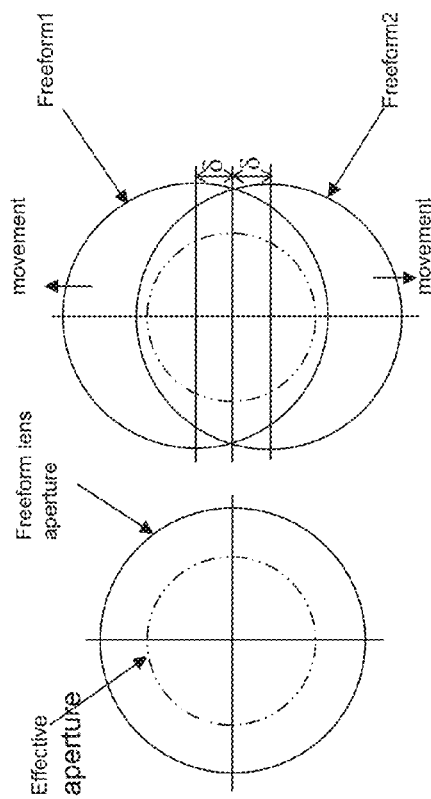
Figure 19 – Effective overlap of lenses at displacement δ
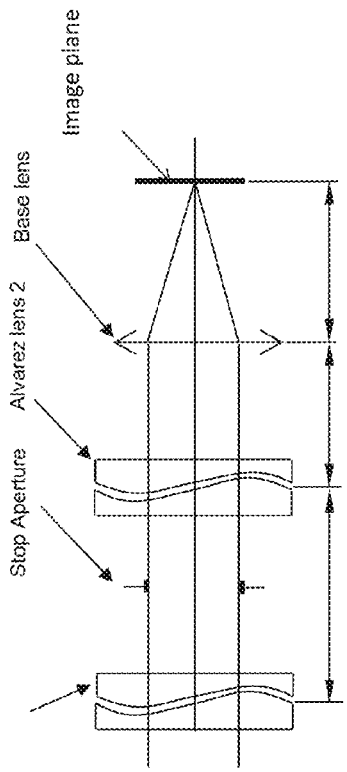
Figure 20 – Optical Configuration

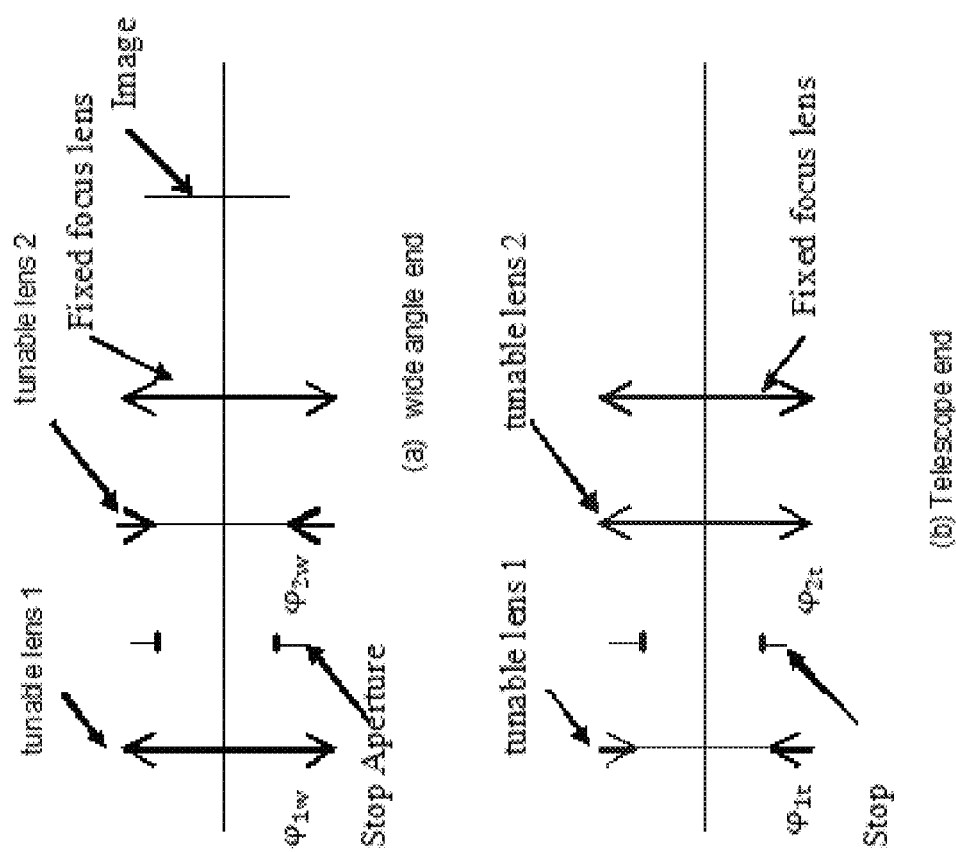

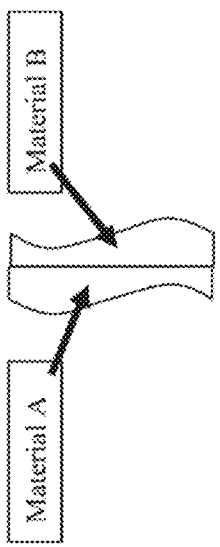

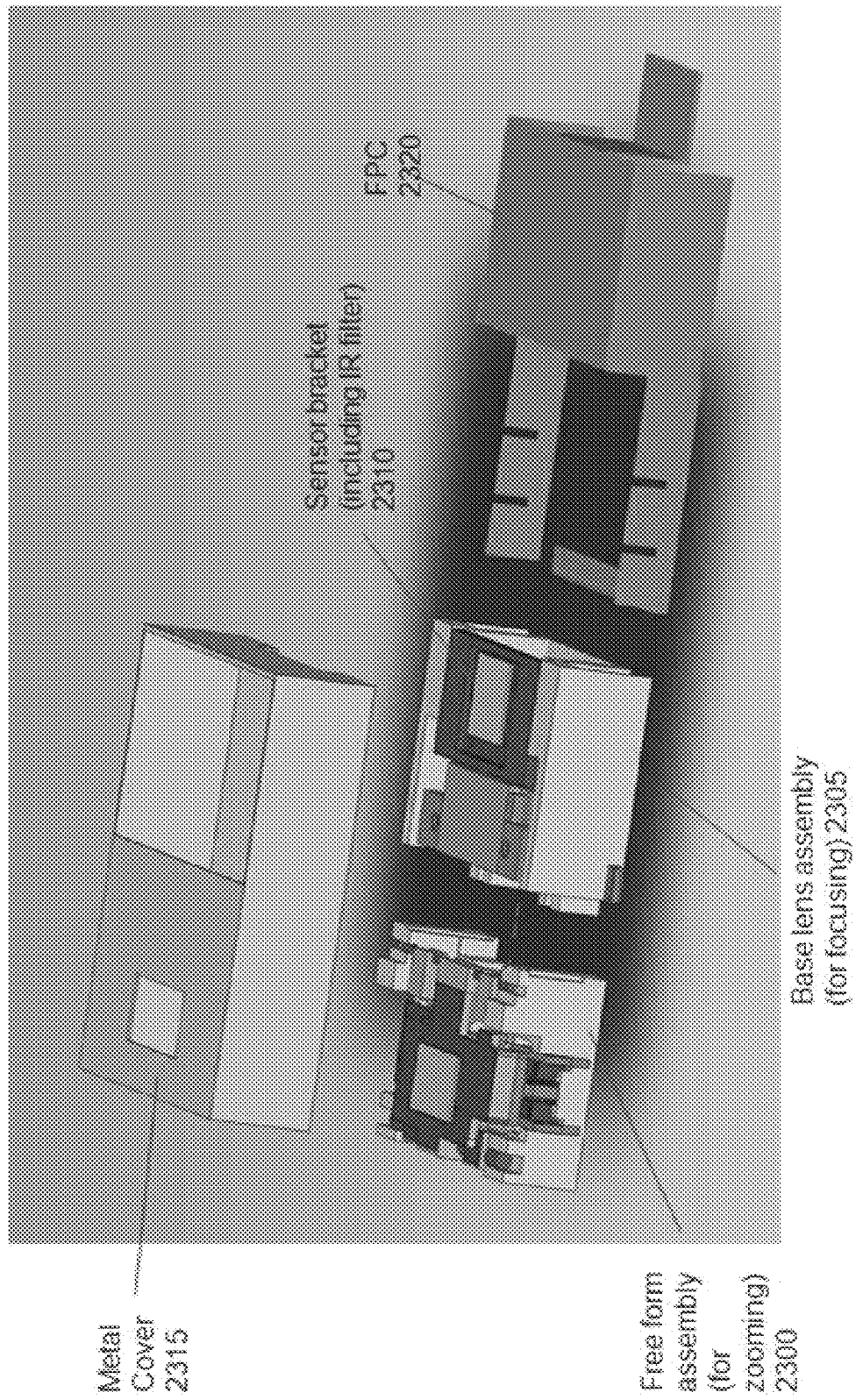
Figure 23: Module Overview

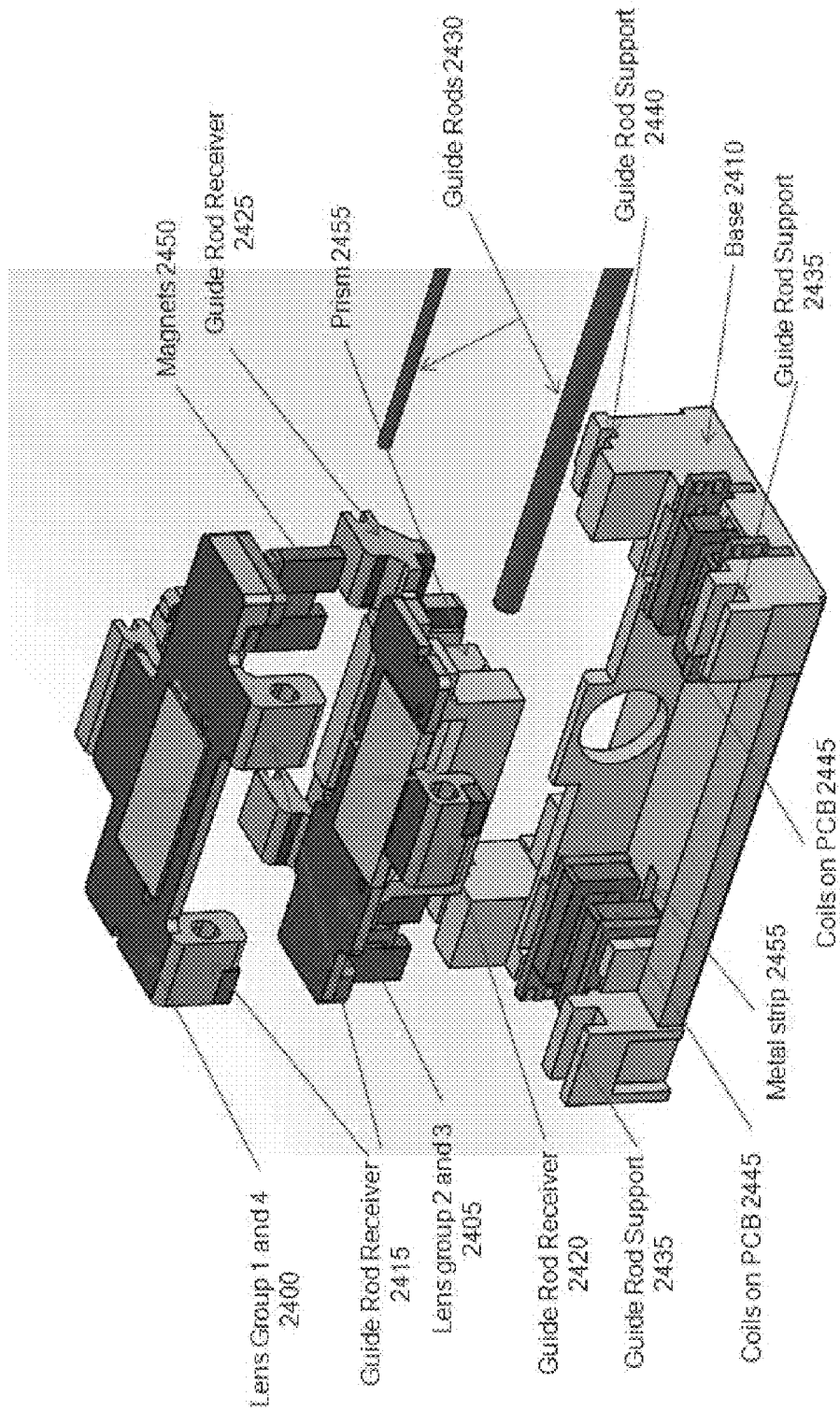
Figure 24: Free form sub-assembly exploded view

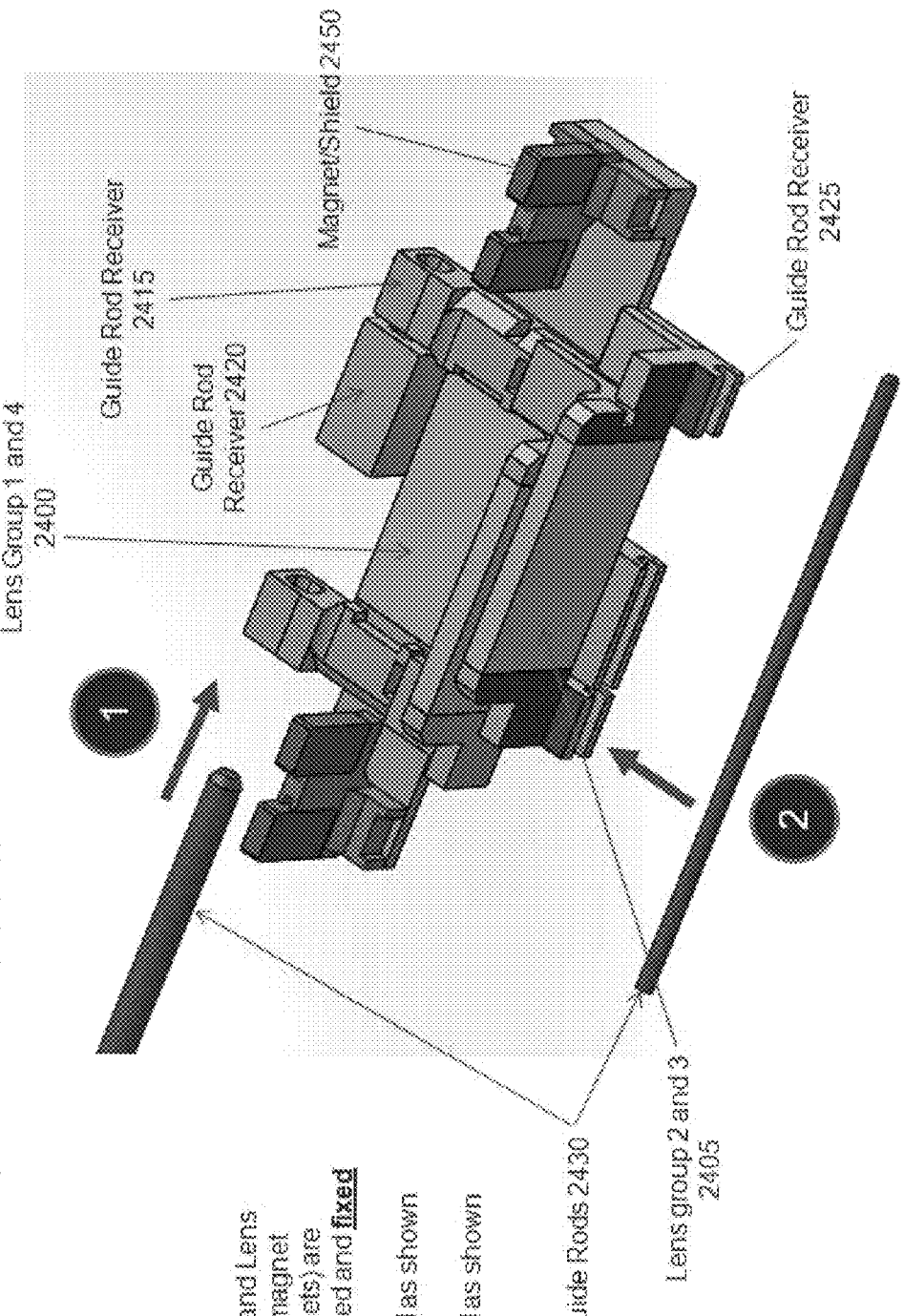

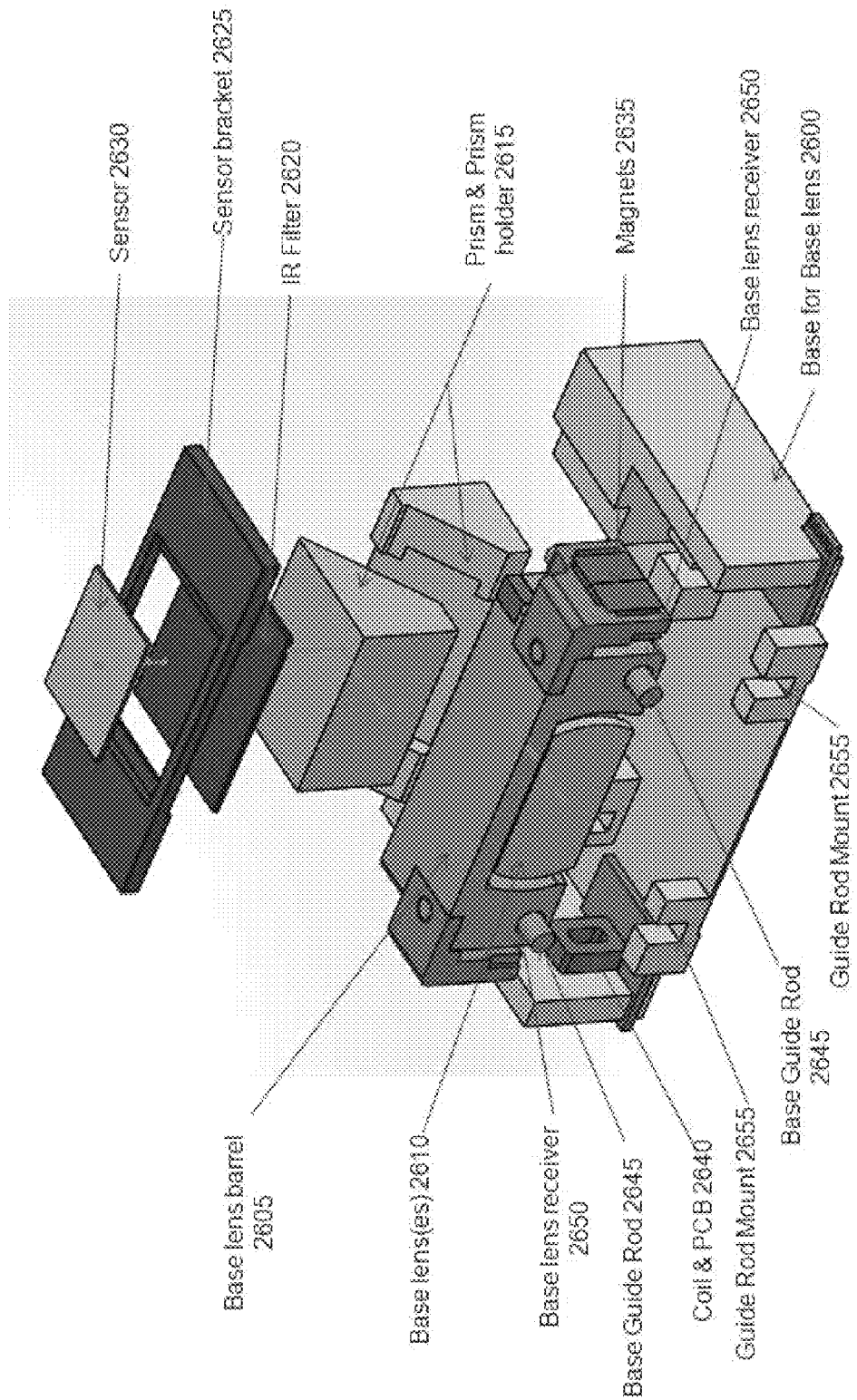
Figure 26. Base lens exploded view

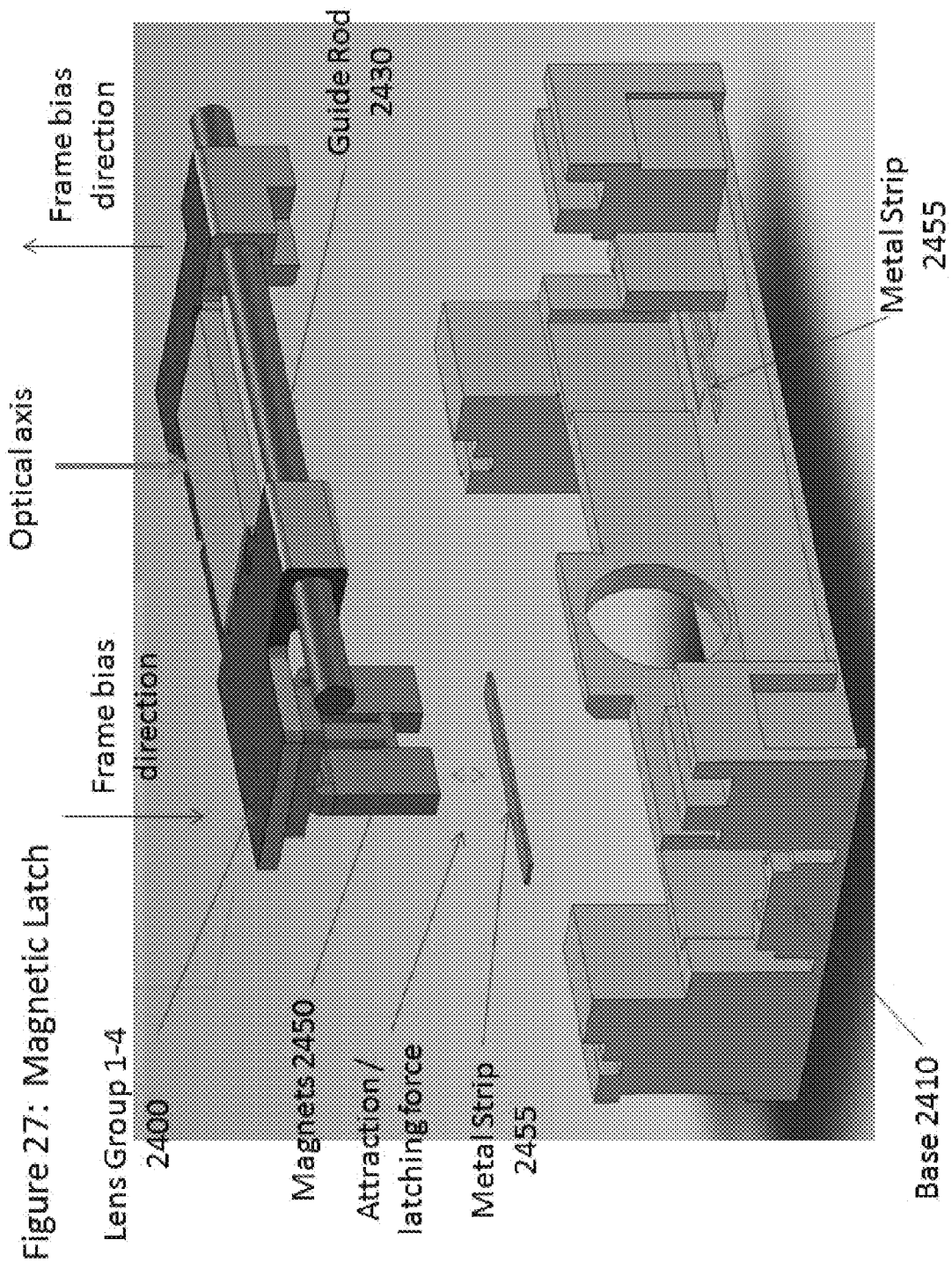

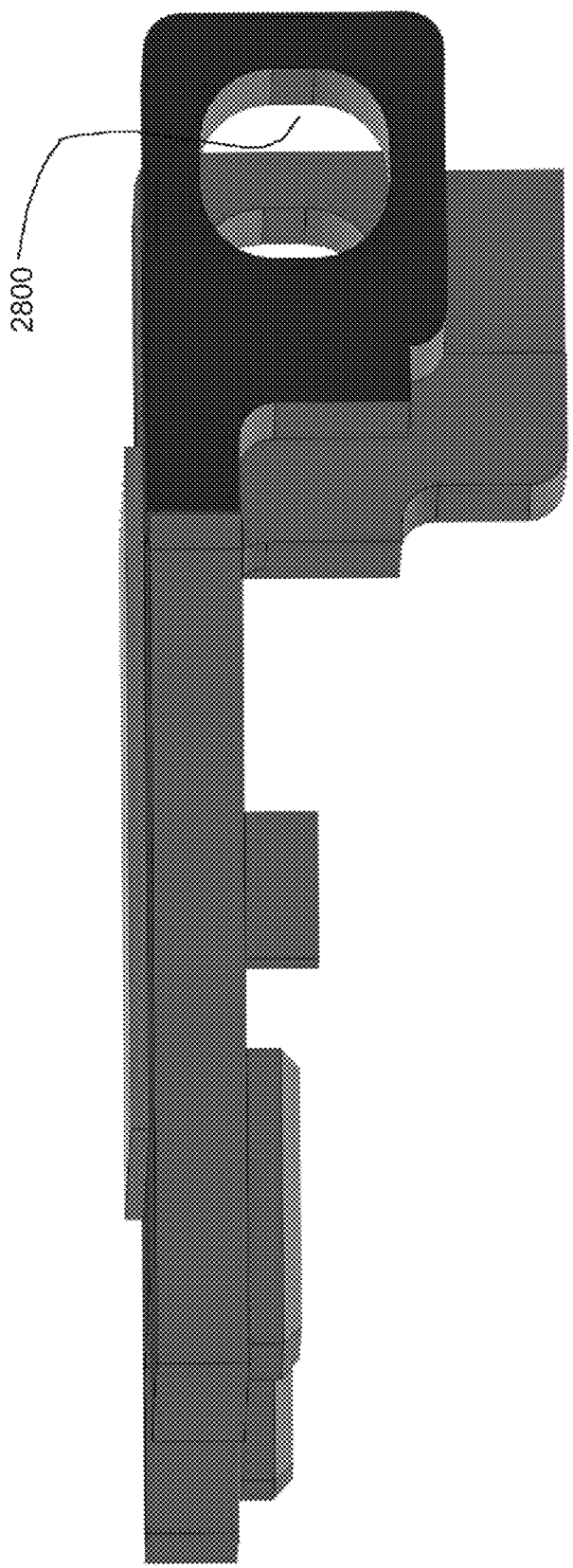
Figure 28: Receiver relief

Lens profile modification for manufacturability

A- Freeform profile area, B- Plane surface, C- Slope surface positioning. With both (4) and (3), both X and Y axis positions of the freeform surface can be inferred.

A- Freeform profile area, B- Plane surface, D- Y-positioning slope surface, E- X-positioning slope surface Use slope to find the center of the freeform surface

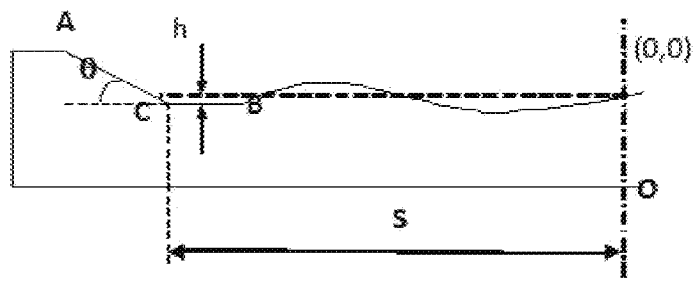
Figure 30C: the designed profile
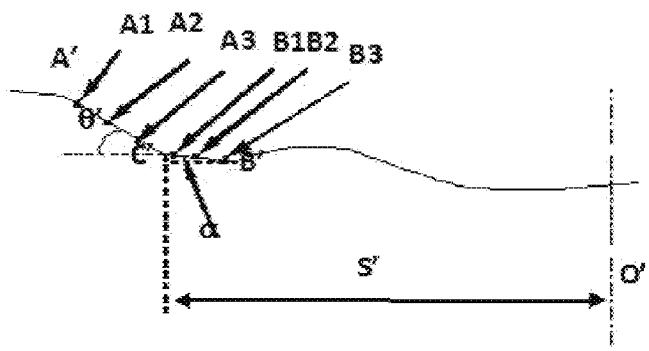
Figure 30D: the measured profile
(scan line by profiler)
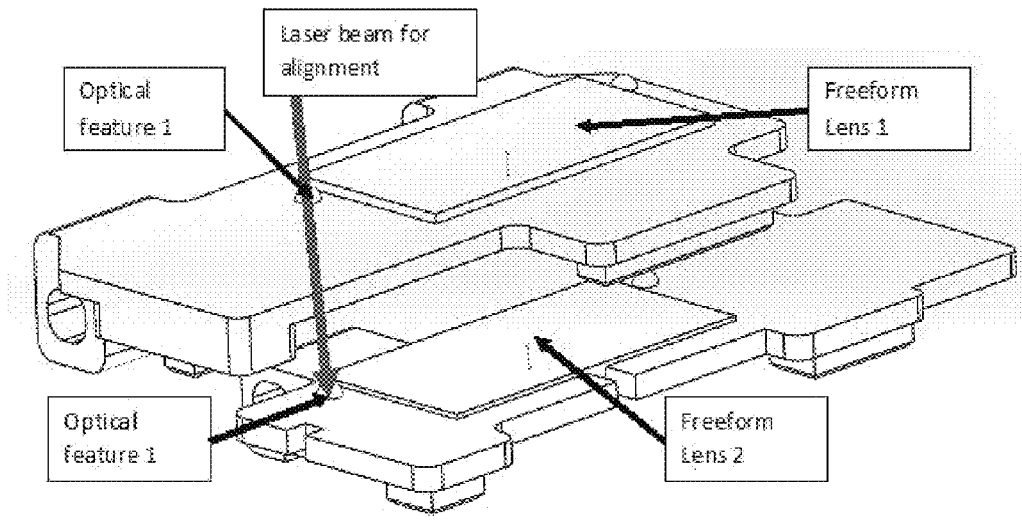
Figure 31A Figure 32A – side view of rotating cams
(a)- Trajectory of Freeform1 cam,
(b)- Trajectory of Freeform2 cam,
(c)- Trajectory of Freeform3 cam,
(d)- Trajectory of Freeform1 cam,
ΔL-Travel range of freeform lens.
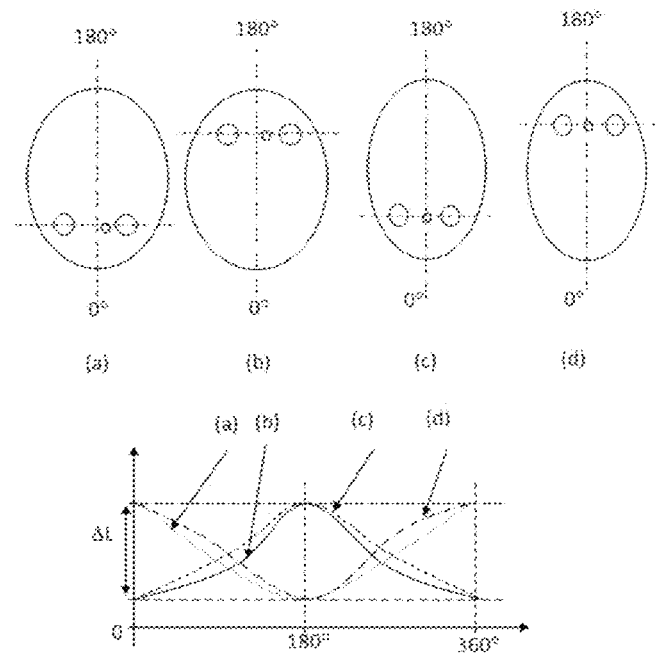
Figure 32B – 360 degree rotation
(a)- Trajectory of Freeform1 cam,
(b)- Trajectory of Freeform2 cam,
(c)- Trajectory of Freeform3 cam,
(d)- Trajectory of Freeform1 cam,
ΔL-Travel range of freeform lens.
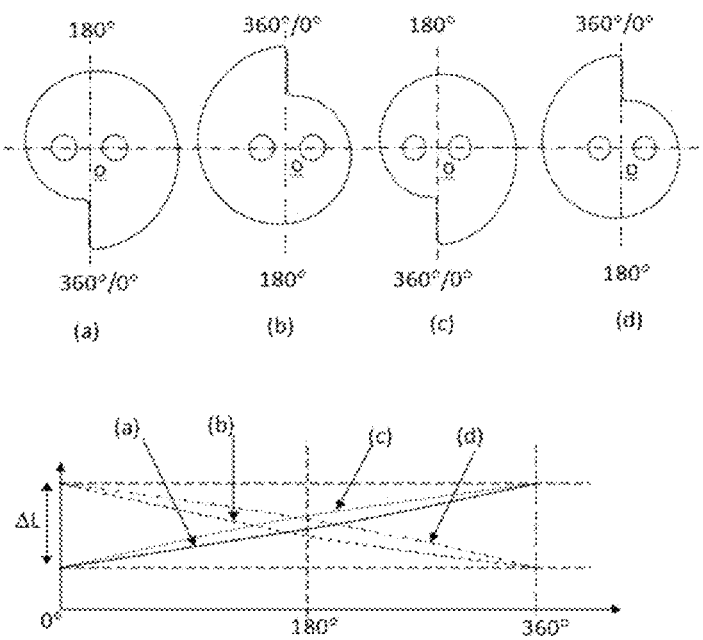

Figure 32C
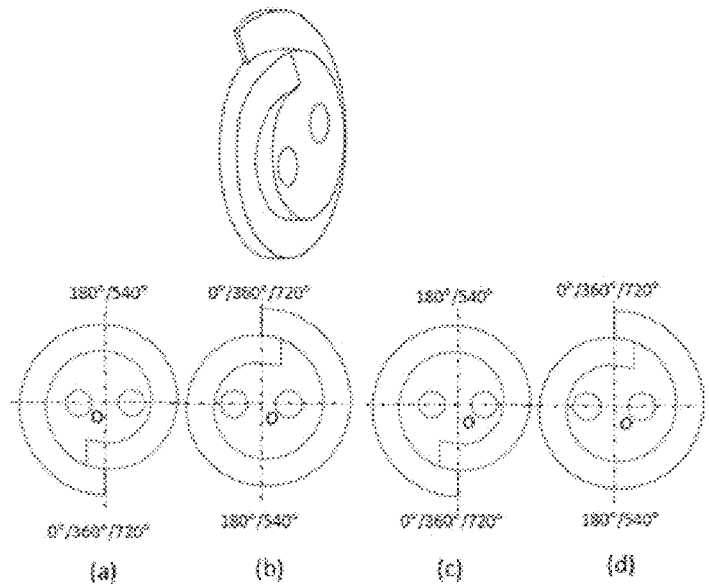
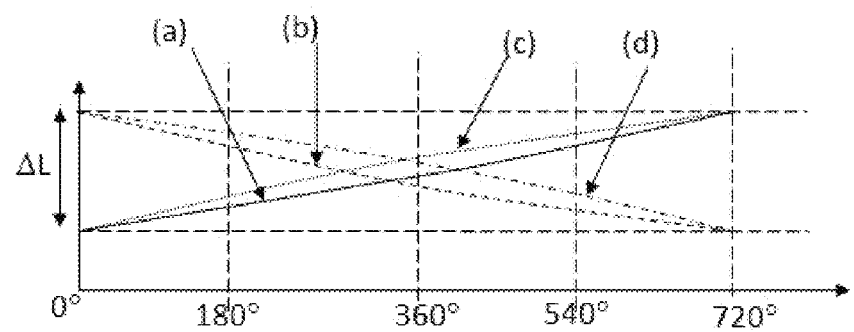
Figure 32 D – travel range for two rotation cam Figure 33A – exploded view of linear cam
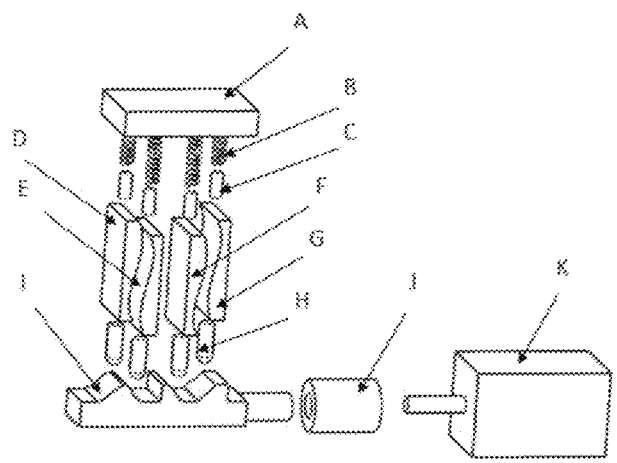
A- Base board, B-Spring, C- Rod, D- Freeform lens1, E- Freeform lens2, F- Freeform lens3, G- Freeform lens4, H- Rod, I- Cam, J- Cam and linear motor connector, K- Linear motor.
Figure 33B – travel distance of linear cam
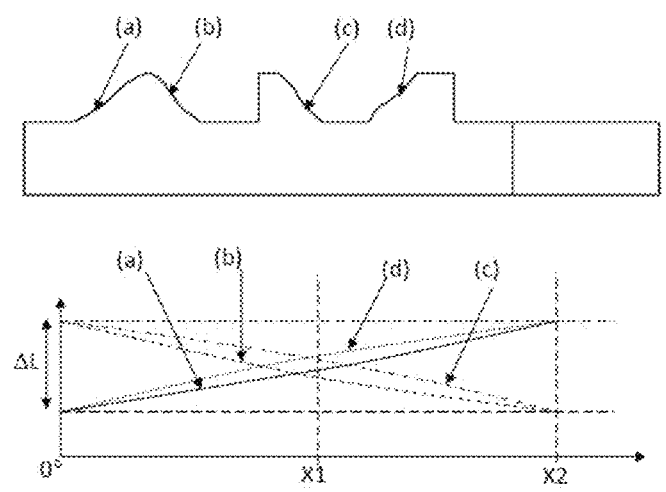

Figure 34A – Rack – Gear Actuation

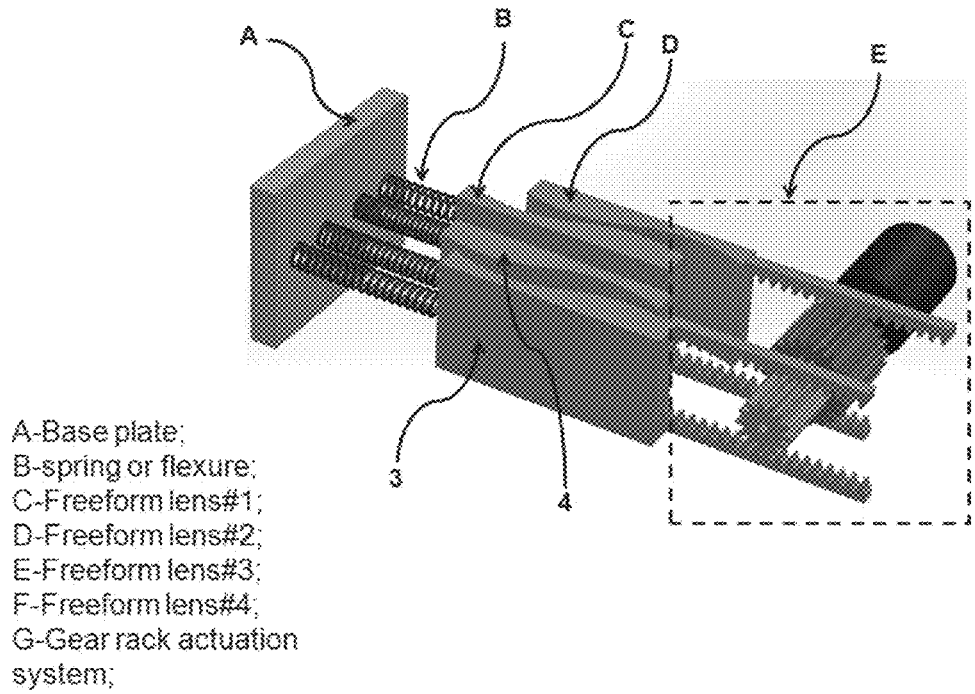

A-Base plate;
B-spring or flexure;
C-Freeform lens#1;
D-Freeform lens#2;
E-Freeform lens#3;
F-Freeform lens#4;
G-Gear rack actuation system;

Figure 34B

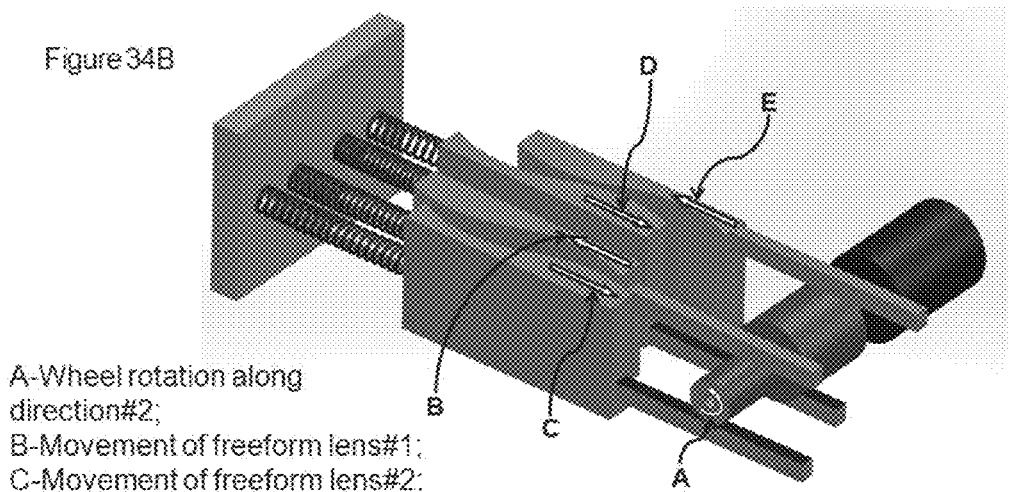

A-Wheel rotation along direction#2;
B-Movement of freeform lens#1;
C-Movement of freeform lens#2;
D-Movement of freeform lens#3;
E-Movement of freeform lens#4;
 Note:
 1) Lenses in each lens pair (FF#1, FF#3) move to opposite direction relative to each other.
 2) The relative displacement of lenses in each lens pair (FF#1, FF#3) is determined by the diameter of its actuation friction wheel.

LENS ASSEMBLIES AND ACTUATORS FOR OPTICAL SYSTEMS AND METHODS THEREFOR

RELATED APPLICATIONS

This application is a Section 371 conversion of PCT Application No. PCT/IB2015/000409, filed on Jan. 8, 2015, which in turn is a conversion of Provisional Patent Application Ser. No. 61/925,215, filed Jan. 8, 2014, and further is a continuation-in-part of PCT/US2013/69288 [now PCT/IB2013/002905], filed Nov. 8, 2013, which in turn claims the benefit of Provisional Patent Applications, Ser. No. 61/874,333, filed Sep. 5, 2013, and Ser. No. 61/724,221, filed 8 Nov. 2012. The present application claims the benefit of priority of each of the foregoing applications, all of which are incorporated herein for all purposes.

FIELD OF THE INVENTION

This invention relates to lens assemblies and actuators for use in combination with imaging sensors, and more particularly relates to lens assemblies and actuators for providing optical zoom in devices such as cameras integrated into cellular phones, security cameras, and other small form factor imaging devices, particularly those which benefit from a small Z dimension.

BACKGROUND OF THE INVENTION

Actuators for optical systems are typically used to reposition one or more lenses of the optical system with respect to an image plane to alter focal length of the optical system. The repositioning generally is intended to achieve either focus or zoom. Actuators for achieving focus are used to adjust the focal length of the optical system in order to make an image distinct or clear. For small scale optical systems, especially in hand-held devices such as phones, electromagnetic actuation systems (aka voice coil motors) systems have been used for focusing. In such arrangements, lenses typically move less than 350 μm along the optical axis to focus. Such electromagnetic systems apply current to the actuator to effect movement of the optical components in a single direction along the optical axis. This movement is counteracted by a spring, which pulls the optical components in the opposite direction. The distance moved is thus a function of the applied current vis-à-vis the tension of the spring.

Actuators for achieving zoom reposition one or more lenses of the optical system with respect to the image plane so the focal length of the optical system is varied to cause a distant object to appear closer without moving the camera. For example, a 2:1 zoom lens at maximum focal length can make an object appear only half as distant from the image sensor as it appears with the zoom lens at minimum focal length.

The proliferation of small scale optical systems for use in, for example, a variety of miniature devices, such as cellphones, tablets, and surveillance cameras, places additional challenges on actuation systems due to a small form factor yet still requiring good performance. The desired performance characteristics of actuator systems in small scale optical systems include positional accuracy, low power, low noise levels, and speed. Positional accuracy is important for achieving desired image quality. Low power consumption is important for prolonging battery life in a variety of handheld mobile devices, and is affected by required stroke length, the force needed to overcome the weight of the moving optical components, and friction. Avoiding or minimizing acoustic noise generated during actuation is important to prevent the capturing of undesired noise by device microphones during video capture. Speed in achieving composition and focus of the desired image (including zoom), which is a function of the speed of component movement as well as displacement distance, is important for meeting the consumers' desired response time for either a zoomed-in or a focused image.

In many modern optical systems, zoom can also be achieved through software means, typically referred to as "digital zoom." Digital zoom is a method of decreasing (narrowing) the apparent angle of view of a digital photographic or video image. Digital zoom is accomplished by cropping an image down to a centered area with the same aspect ratio as the original. Digital zoom is accomplished electronically, with no adjustment of the camera's optics, and no optical resolution is gained in the process. The cropping leads to a reduction in the quality of the image. In many instances, digital zoom also includes interpolating the result back up to the pixel dimensions of the original. This combination of cropping and enlargement of the pixels typically creates a pixelation/mosaic effect in the image, and typically introduces interpolation artifacts. Such pixelation typically results in an image of significantly reduced quality. In addition, digital zoom has typically been implemented as a series of increments, rather than continuous zoom. Thus, for example, some digital zooms are implemented in one-tenth power increments, while others use larger increments. This corresponds to a reduction in the effective size of the sensor.

Some prior art has attempted to overcome the shortcomings of digital zoom by providing an oversized sensor, for example forty-one megapixels. In such an arrangement, the narrowing of the field of view, and thus the cropping, that is inherent in digital zoom still illuminates a significant number of megapixels. The resulting, zoomed image therefore appears more acceptable even though cropped in the conventional manner. In one version of such a prior art design, the full size sensor is said to be used at the full field of view (or widest angle), but an image at 2× zoom uses only approximately eight megapixels of that sensor, and an image at 3× zoom uses only about five megapixels of the sensor.

However, the oversized sensor is physically larger than is desirable for mobile devices such as cellular phones, in addition to being prohibitively expensive for most such devices. In addition, the larger sensor also needs a longer optical path to the sensor, to ensure the image covers the entire sensor. As such, there is still often a z-axis protrusion, not just a larger x, y of the sensor.

Unlike digital zoom, optical zoom has long been used in photography and other optical systems to provide zoom without loss of image quality. Typical lens systems which provide optical zoom using concave or convex lens elements move one or more lens elements along the optical axis, and in most such systems the optical center of each lens element is located on the optical axis. While such systems can provide excellent image clarity, they require that the lens elements travel too great a distance to be suitable for many applications which require a small form factor. For example, in cameras used in cellular phones, the electronics of the cellular phone imposes severe limits on the form factor of the lens module used in the cell phone's camera, and such limits prohibit the use of conventional optical zoom.

While some cellular phones have offered lens systems which provide optical zoom for use with their integrated cameras, these have typically greatly increased the thickness of the cell phone in at least the area of the camera's lens system. In addition, prior art optical zoom capable of, for example, 3× magnification, where the lenses move along the optical axis, typically require the optical components to move greater than 10 mm. Such a long travel range typically requires the use of stepper motors. This is not ideal for small scale optical systems used in mobile devices as they are bulky, require more power to move such a long distance, and may cause acoustic noise to be picked up by device's microphone. Other actuation systems include piezo motors to actuate optical components parallel to the optical axis to create optical zoom and autofocus. However, piezo motors also tend to be acoustically noisy as well as creating hysteresis issues requiring more complicated electronics to overcome. Piezo motors also tend to use more power than some other designs. In addition, systems using conventional concave-convex lenses to offer optical zoom require a significantly longer stroke than is currently desired, increasing battery drain as well as requiring a significantly larger form factor for the lens module.

There has therefore been a long felt need for an optical system suitable for use in mobile devices such as cellular phones or other small scale systems which provides the clarity of optical zoom in a small form factor, yet does not require excessive power.

SUMMARY OF THE INVENTION

The present invention provides optical zoom in a small form factor suitable for use in mobile devices such as cell phones, security cameras, and other small-scale imaging systems. To achieve the requisite small form factor required for such devices, one or more Alvarez (or Lohmann) lens pairs are provided, and moved transversely to the optical axis by means of the actuator described herein.

In an embodiment, the combination of one or more Alvarez lens pairs and the actuator permits a zoom power of up to 6× with a lateral displacement distance of the optical components of approximately five millimeters or less. Such an optical system is thus well suited to use in cellular devices and, further, can be readily implemented as a lens module having a very small form factor, for example 10×10×6 mm [X×Y×Z] or less. Zoom powers in excess of 6× can be achieved with a displacement of ten millimeters or less, although the form factor is somewhat larger. Depending upon the embodiment, larger form factors are also acceptable, for example 30×30×6 mm. In some embodiments, Z height is less than 6 mm, for example 5.8 mm or less. In addition to providing the clarity of optical zoom in a small form factor, the systems of the present invention offer the benefits of very low power consumption as well as low acoustic noise. In addition, the actuator of the present invention has the additional benefit of minimal magnetic degradation across the stroke plane.

The present invention further comprises methods for optimizing spacing between the lenses of one or more pairs of Alvarez or Lohmann (for convenience, sometimes referred to hereinafter as freeform lenses), lenses configured to create an optical zoom system, where the lenses are moved transversely to the optical axis. Each of the freeform lenses can have one or more freeform surfaces. In some embodiments, each lens of the freeform pair has one planar surface and one freeform surface, with the freeform surfaces facing one another. The distance, or gap, between the lenses is carefully selected to ensure that the lenses do not touch each other as they move transversely to the optical axis to provide magnification, while at the same time minimizing or reducing optical aberrations.

In an embodiment, translation of the freeform lenses relative to one another provides both focusing and magnification, or zoom. In an alternative embodiment, translation of the freeform lenses provides magnification, while a base lens is separately actuated to provide focus. In some embodiments, the base lens is actuated along the optical axis, and comprises one or more concave or convex lenses.

In an embodiment, the zoom is continuous throughout the range of focal lengths provided by the system. In an alternative embodiment, one or more latch positions are used to provide discrete zoom increments. In an embodiment, the latch positions are maintained by one or more magnetic latches, while in another, mechanical latches are used.

It is therefore one object of the present invention to provide a camera's lens module with optical zoom sized to fit within the form factor of small devices such as smartphones without increasing the height of the smartphone.

It is another object of the present invention to provide optical zoom in a lens module configured to fit within the form factor required for a camera integrated into a smartphone.

It is a further object of the present invention to provide an optical system comprising an actuator and at least one lens pair wherein the actuator moves the lenses in a direction other than parallel to or collinear with the optical axis of the system to achieve both zoom and focusing.

It is a still further object of the present invention to provide an actuator for a lens system suitable for use in a smartphone in which continuous zoom wherein latches maintain the position of at least one of the freeform lenses.

These and other objects of the present invention will be better appreciated from the following detailed description, taken in combination with the Figures described hereinafter.

THE FIGURES

FIG. 1 illustrates in block diagram form an optical system comprising optical zoom with lateral actuation in accordance with the present invention.

FIG. 2A illustrates in exploded perspective view an embodiment of an actuator for a zoom lens group which moves one or more lenses of the group laterally to the optical axis.

FIG. 2B illustrates a partial assembly of an embodiment of the zoom lens group and actuator, including showing the magnet assemblies for the actuator.

FIG. 2C shows a fully assembled embodiment of the zoom lens and actuator.

FIG. 2D shows an alternative embodiment to some aspect of the zoom lens assembly of FIG. 2C, wherein the lens frames are received in slots of the housing, thus avoiding the need for one or more guide frames.

FIG. 3A illustrates in exploded perspective view an embodiment of a focusing lens group including its actuator.

FIG. 3C shows a fully assembled embodiment of a focusing lens group with actuator.

FIG. 4A illustrates the optical path for an embodiment of the invention including a zoom lens group as in FIG. 2A and a focusing lens group as in FIG. 3A, with Alvarez lens pairs arranged in the wide angle position.

FIG. 4B illustrates the optical path for an embodiment of the invention including a zoom lens group as in FIG. 2A and a focusing lens group as in FIG. 3A, with Alvarez lens pairs arranged in the zoom or telephoto position.

FIG. 4E illustrates a lens system suitable for use in a miniaturized environment such as a cell phone, security camera or related system in which two Alvarez pairs provide optical power, with both lenses in each pair having dual rotationally asymmetric surfaces.

FIG. 5 illustrates an embodiment of a double coil voice coil motor (VCM) suitable for use in the actuator of FIG. 2A.

FIG. 6 illustrates a lens holder as depicted in FIG. 2 with an armature for holding a double coil VCM as shown in FIG. 5.

FIG. 7 illustrates a variety of coil and magnet sizes for use in a VCM in accordance with an embodiment of the invention.

FIG. 8 illustrates in perspective view an embodiment of the invention in which an actuator is configured to move one lens from each of two pairs of Alvarez lenses together in a direction generally laterally to the optical axis, in a configuration generally referred to as 1-4, 2-3.

FIG. 9 illustrates in perspective view an embodiment of the invention in which an actuator is configured to move one lens from each of two pairs of Alvarez lenses together in a direction generally laterally to the optical axis, in a configuration generally referred to as 1-3, 2-4.

FIG. 11 illustrates a magnetic latch as used in some embodiments of the invention.

FIG. 12 illustrates in side view the magnetic latch of FIG. 11.

FIG. 13 illustrates an embodiment of the invention in which a guide frame limits the travel of at lens one of the Alvarez lens elements.

FIGS. 14A-14B illustrate two different designs for discrete position magnetic latches suitable for use in some embodiments of the invention.

FIG. 15 illustrates an embodiment of the invention in which the magnetic latch includes an on/off coil.

FIG. 16 shows an embodiment having multiple discrete positions using magnetic latching.

FIG. 17 illustrates the use of a position sensor to identify the position of the lens frame throughout its lateral stroke.

FIG. 18 depicts a generalized model of an Alvarez Lens, or lens pair.

FIG. 19 shows the effective aperture which occurs as each lens of an Alvarez pair moves through its stroke.

FIG. 20 illustrates in simplified form the interaction of two Alvarez pairs with an intermediate aperture, coupled to a base lens for focusing an image on an image plane.

FIG. 21 illustrates the interaction of fixed an tunable lenses for creating an image on an image plane.

FIG. 22 illustrates the use of different materials in opposing elements of the Alvarez pair, where the different materials assist in reducing or canceling chromatic or other aberrations.

FIGS. 23-28 illustrate an alternative embodiment of an actuator and lens system in accordance with an embodiment of the invention.

FIGS. 30A-30D illustrate techniques for finding the x and y positions and the center of a freeform surface.

FIGS. 31A-31D illustrate techniques for ensuring alignment of freeform lenses during manufacturing.

FIGS. 32A-32D illustrate the operation of a cam-driven actuator capable of separately positioning each side of multiple Alvarez pairs, for example, moving each of four Alvarez lens elements arranged in two Alvarez pairs through separate strokes.

FIGS. 33A-33B illustrate the operation of a linear cam actuator also capable of moving multiple lenses through separate strokes.

FIGS. 34A-34B illustrate a gear driven actuator and a friction driven actuator suited for moving Alvarez lenses lateral to their optical axis.

DETAILED DESCRIPTION OF THE INVENTION

Figure 3B:
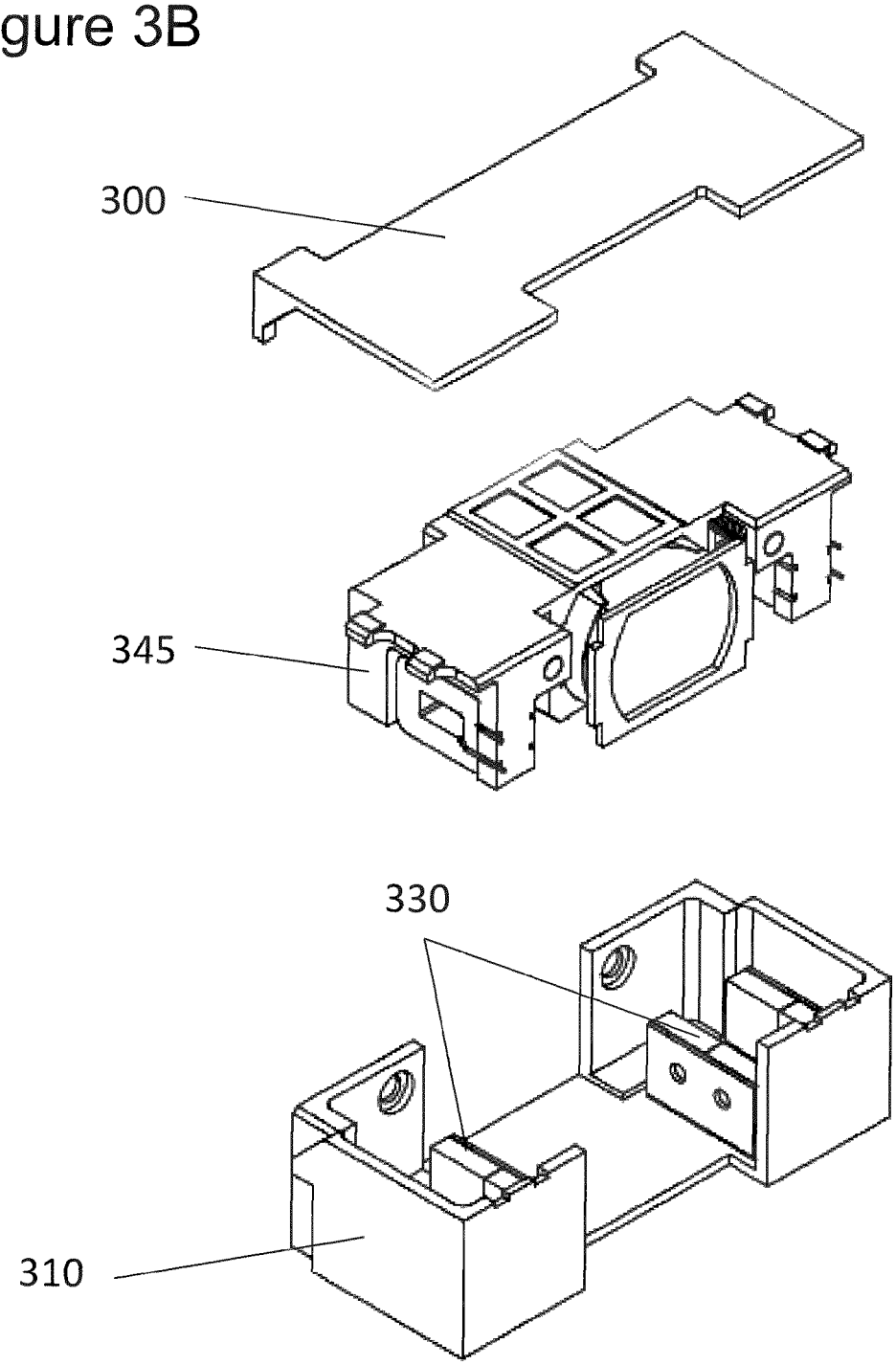
FIG. 3B shows a partially assembled embodiment of a focusing lens group with actuator.

Referring first to FIG. 1, an optical system 100 including autofocus and optical zoom is shown in system block diagram form. In particular, a camera module 105 cooperates with a processor module 110 such as integrated into a smart phone, although the camera module of the present invention can also be implemented independently of a smartphone, such as a security camera or other form of image capture device where a small, or miniature, form factor with optical zoom is desirable. In the camera module, when the user desires to take a picture (user-driven inputs not shown in FIG. 1 for convenience), a driver circuit 115 sends current to a lens module 120, and, in an embodiment, initially to a focusing actuator 125 to allow the user to see a clear image. The focusing actuator, described in greater detail hereinafter, automatically adjusts the position of a focusing lens group 130 until a clear image is achieved at a sensor 135, using an image signal processor ("ISP") 140 to provide the necessary feedback to the driver circuit 115 to implement any of the suitable autofocus methods known in the art, such as, for example, contrast detection. The autofocus loop can be appreciated from the dashed line in FIG. 1. It will be appreciated that, while the ISP 140 is shown in FIG. 1 as within the phone processor, in at least some embodiments the ISP is included within the lens module 105. In some embodiments, particularly those implemented in smartphones, the outputs from the autofocus algorithm existing in the smartphone processor is converted into inputs recognizable by the focusing portion of the driver circuit.

If the user desires to zoom in on the subject, as indicated by a user input (again not shown in FIG. 1 for convenience), the driver circuit 115 supplies current to a zoom actuator 145 within the lens module 120. The zoom actuator, described in greater detail hereinafter, moves a zoom lens group 150 through a stroke until the user indicates that the amount of zoom is acceptable. The zoom lens group and the autofocus lens group cooperate to achieve both magnification and image clarity at the sensor. Importantly, for the small form factor of the invention described herein, the zoom actuator moves the zoom lenses in a direction essentially lateral to the optical axis, and, in an embodiment, substantially perpendicular to the optical axis. In particular, the zoom lenses comprise one or more pairs of freeform lenses, such as Alvarez or Lohmann lenses, rather than the conventional concave or convex lenses typically found in prior art optical zoom systems which achieve both focus and zoom by moving the lenses along the optical axis. It will be appreciated that the lateral movement need not be substantially perpendicular in all embodiments as long as suitable magnification and acceptable clarity is achieved.

Once the user is satisfied with both the amount of magnification of the image and its clarity, the user "takes" the picture by causing the ISP 140 and graphics processing unit (GPU) 155 to capture the image from the sensor 135. It will be appreciated that the GPU is typically embedded within a modern smartphone, but, in at least some embodiments of the invention, the processor is maintained within a different type of device such as a security camera, computer system, tablet, etc.

Referring next to FIG. 2A-2D, the zoom actuator and associated zoom lens group of the present invention can be better appreciated. A free-form lens housing cover 200 is positioned at the top of a zoom lens group assembly, shown in partly and fully assembled form in FIGS. 2B and 2C. The housing cover 200 fits over a first free-form lens cover 205, which in turn is positioned over a first free-form lens subassembly 200 which, as described in greater detail hereinafter in connection with FIGS. 5 and 6, among others, comprises a first free-form lens mounted in a lens frame on an armature. The armature, as discussed in connection with FIG. 6, is also adapted to house at least part of a mechanism for moving the first free-form lens laterally to the optical axis. In an embodiment, the mechanism is a voice coil motor, although the movement-inducing mechanism can also be a piezo motor, shape memory alloy (SMA) or other suitable device. For convenience, the description of motor used hereinafter will be a VCM, although it is to be understood that other forms of motors are acceptable except as limited by the claims.

The first lens subassembly 210 fits into a first guide frame 215, which is positioned over a second free-form lens subassembly 220. The subassembly 220 comprises a second free-form lens either mounted above or integrated with a prism for redirecting the optical axis in the manner shown by the ray paths depicted in FIGS. 4A-4B, and further comprises an arm on which a lens frame is mounted for supporting at least the second free-form lens as well as the coils of a VCM as discussed in connection with FIGS. 5 and 6.

The subassemblies 210 and 220 together form a first freeform lens pair, and, in some instances hereinafter, are referred to as lenses one and two. The subassembly 220 fits within a base 225, having the subassembly 210 and associated guide frame and covers atop the subassemblies as better shown in FIGS. 2B and 2C. In the embodiment shown in FIG. 2A, a third free-form lens subassembly 230, again comprising an arm having a lens frame into which is mounted a third free-form lens, is shown. It will be appreciated that the third subassembly 230 is at right angles to the first and second subassemblies 210 and 220, to account for the change in the optical axis due to the prism. A second guide frame 235 is positioned over the third subassembly 230, and a fourth free-form lens subassembly 240 is received within the guide frame 235. It will be appreciated that the lenses of the third and fourth subassemblies comprise a second pair of free-form lenses and will in some instances hereinafter be referred to as lenses three and four.

A pair of magnet structures 245, which, together with the coils mounted on the first and second subassemblies form a pair of VCM's, one for each pair, is maintained within an shield and housing 250. In an embodiment, the magnet structures 245 comprise a plurality of permanent magnets, for example, three, suitable for cooperating with two VCM coils in each VCM to form a double-coil VCM for both the first subassembly and the second subassembly. A second pair cover 255 is positioned over the fourth subassembly to enclose the zoom lens group and actuator, as better appreciated from FIGS. 2B and 2C.

In an embodiment, the third and fourth subassemblies do not include any portion of a VCM. Instead, for the embodiment shown in FIG. 2A, the third subassembly includes an extension 260 maintained at right angles to the remainder of the arm. This extension fits into a slot 265 on the first subassembly 210, such that the first and third lens move together. Similarly, the fourth subassembly arm includes an extension 270 which fits into a slot 275 in the second subassembly, such that the second and fourth lenses move together. This configuration, referred to sometimes hereinafter as the 1-3, 2-4 configuration, can be better appreciated from FIG. 8. In an alternative embodiment, the fourth lens subassembly can be mounted to the first lens subassembly, and the third lens subassembly can be mounted to the second lens subassembly, resulting in the 1-4, 2-3 configuration shown in FIG. 9. In still further alternative embodiments, the third and fourth subassemblies can include VCM's and move independently of the first and third subassemblies, although such an embodiment will require a larger form factor and typically will use more power. Furthermore, other embodiments may include two or more lens elements mounted on the same actuator arm moving either in tandem or independently to align the lens elements. Given the teachings herein, those skilled in the art will recognize numerous alternatives to the particular embodiments illustrated herein which do not vary from the fundamental inventive structures and methods discussed.

Referring more particularly to FIGS. 2B and 2C, the subassemblies of the four free-form lenses can be seen to form a compact, miniature optical zoom lens assembly as indicated at 280A (partly assembled) and 280B (fully assembled). FIG. 2B also provides a clearer illustration of the coils 285 mounted on the second subassembly and which form the VCM together with the magnet structure 245 at the left of housing 250. Similarly, the other magnet structure 245 shown at the right of housing and magnetic shield 250 cooperates with coils on the first subassembly to form a VCM for that structure.

Referring next to FIG. 2D, an alternative embodiment of the guide frame is shown. In the structure of FIG. 2D, a housing 286 includes recesses 288 for receiving first and second lens frames 290 and 292 on which the first and second free-form lenses (not shown) are mounted, respectively. Similarly, but mounted vertically instead of horizontally, third and fourth lens frames 294 and 296 are received in slots 298 in housing 286. This structure permits a reduced part count and simplified manufacturing, as compared to the structure of FIGS. 2A-2C.

Referring next to FIGS. 3A-3C, the focusing lens group, sometimes hereinafter referred to as a base lens group, can be better understood. The focusing lens group moves a group of concave-convex lens elements along the optical axis, and, in an embodiment, provides both focus and distortion correction with respect to the zoom lens group. Structurally, a base lens cover 300 encloses the top of a base lens barrel 305, which is contained within a base lens holder 310. A pair of compression springs 315 and associated rods 320 fit within orifices in the base lens holder, to provide a balancing force against a pair of VCM's comprised of coils 325 and companion magnet structures 330. The magnet structures 330 are housed within the holder 310, while the coils are mounted to either side of the barrel 305 and fit in the space between the magnets on either side of the structures 330, thus providing a Lorentz force to the barrel when current is applied to the coils. In some embodiments in which a opposite polarity currents are applied to cause bi-directional movement, the springs 315 may not be necessary. Lens elements 335 fit within the barrel 305 and are held in position by means of bezel 340, which also serves as a mechanical stop to position the lenses. In some embodiments a stop may be positioned between the lenses.

A partly assembled focusing lens group and actuator is shown in FIG. 3B, as indicated at 300, 310 and 345. A fully assembled actuator and lens group is shown in FIG. 3C, as indicated at 350.

Figure 4C:
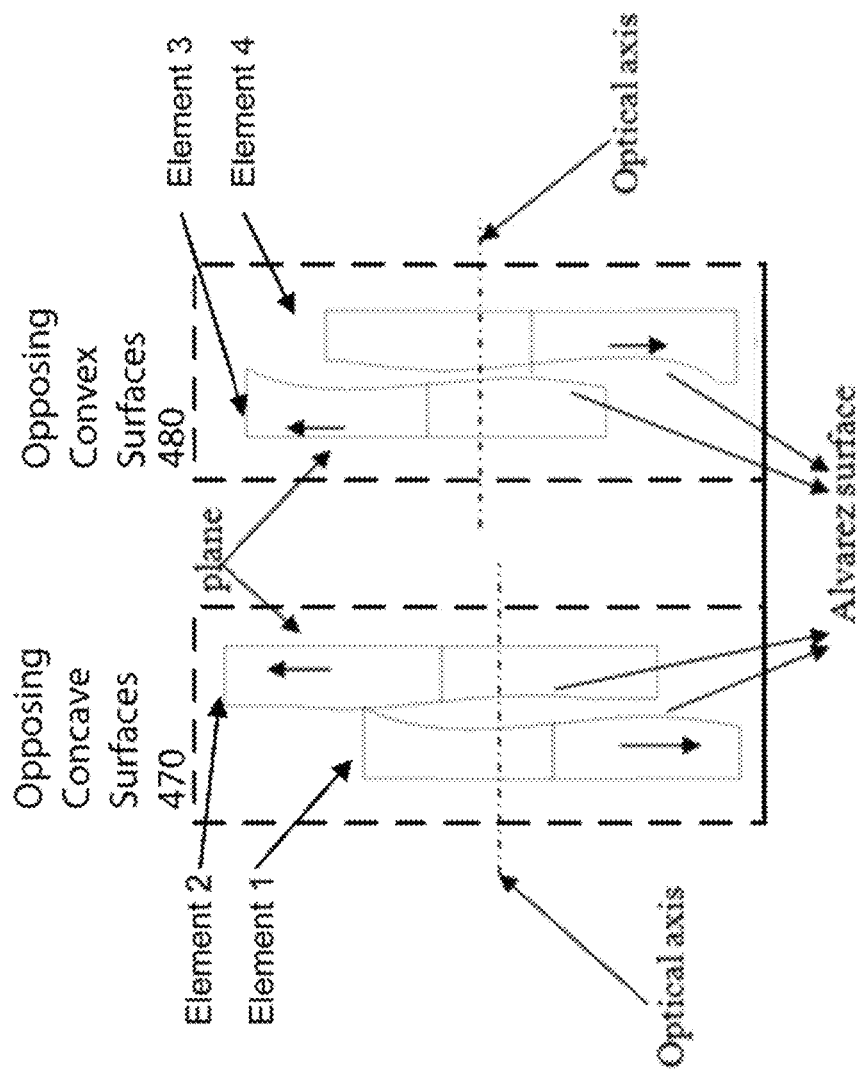
FIG. 4C illustrates how an Alvarez pair yields the equivalent of opposing concave surfaces and opposing convex surfaces, depending upon where in their stroke the lenses of the pair are relative to one another.

Referring next to FIGS. 4A-4C, the optical relationships between the elements of the zoom lens group and the elements of the focusing lens group can be better appreciated, where FIG. 4C gives a general indication of the shape of the Alvarez lens pairs indicated in FIGS. 4A-4B. More detail about the Alvarez lens pairs can be found in co-pending U.S. patent application Ser. No. 14/246,571, filed Apr. 7, 2014, in the name of the National University of Singapore, and titled MEMS-Based Zoom Lens System, incorporated herein by reference, as well as International Patent Application PCT/US13/69288, assigned to the same assignee as the present invention and also incorporated by reference. With respect to FIG. 4C, it is to be understood that, while the two pairs are shown side by side for convenience, one pair is positioned ahead of the prism (or includes the prism) and the other is after the prism, as shown in FIG. 4A-4B.

In the embodiment of FIG. 4A, the arrangement of the free-form (sometimes also referred to as varifocal) lenses is shown with the lenses in the wide angle position, indicated as "WA". In this position, the first Alvarez Pair 400 can be represented, for the sake of illustration, as having two opposing concave surfaces. With reference to FIG. 4C, it can be seen that this lateral position of the Alvarez pair is depicted as 470. It will be appreciated that the top surface of the prism 405 can be formed as an Alvarez surface, or can be a separate lens with an Alvarez surface positioned above the prism, or can be a separate Alvarez lens cemented to the prism in a manner well known in the art. The second Alvarez pair 410 can be represented in the wide angle position, again for the sake of simplicity, as having two opposing convex surfaces, with a substantially planar surface at the outlet of the zoom lens group. This lateral position of the Alvarez pair is shown in FIG. 4C at 480. As will be appreciated hereinafter, in various embodiments the Alvarez pairs can have rotationally asymmetric surfaces on both sides, rather than planar surfaces, and the combination at any given more in the lateral stroke is more complex than a pair of concave or convex surfaces. The focusing lens group 415 comprises conventional convex and concave optics, and transmits the image to the sensor 420. These rotationally symmetric lenses can comprise one or more groups, and, depending upon the embodiment, can from one to four, or more, such lenses.

In the embodiment of FIG. 4B, the free-form lens pairs are shown in the zoom position, indicated as "Z". The first lens pair 450 can be represented as two opposing convex lens surfaces, while the second pair 460 can be represented as two opposing concave surfaces, both as shown in FIG. 4C. The focusing group and sensor remain the same as in FIG. 4A.

Figure 4D:
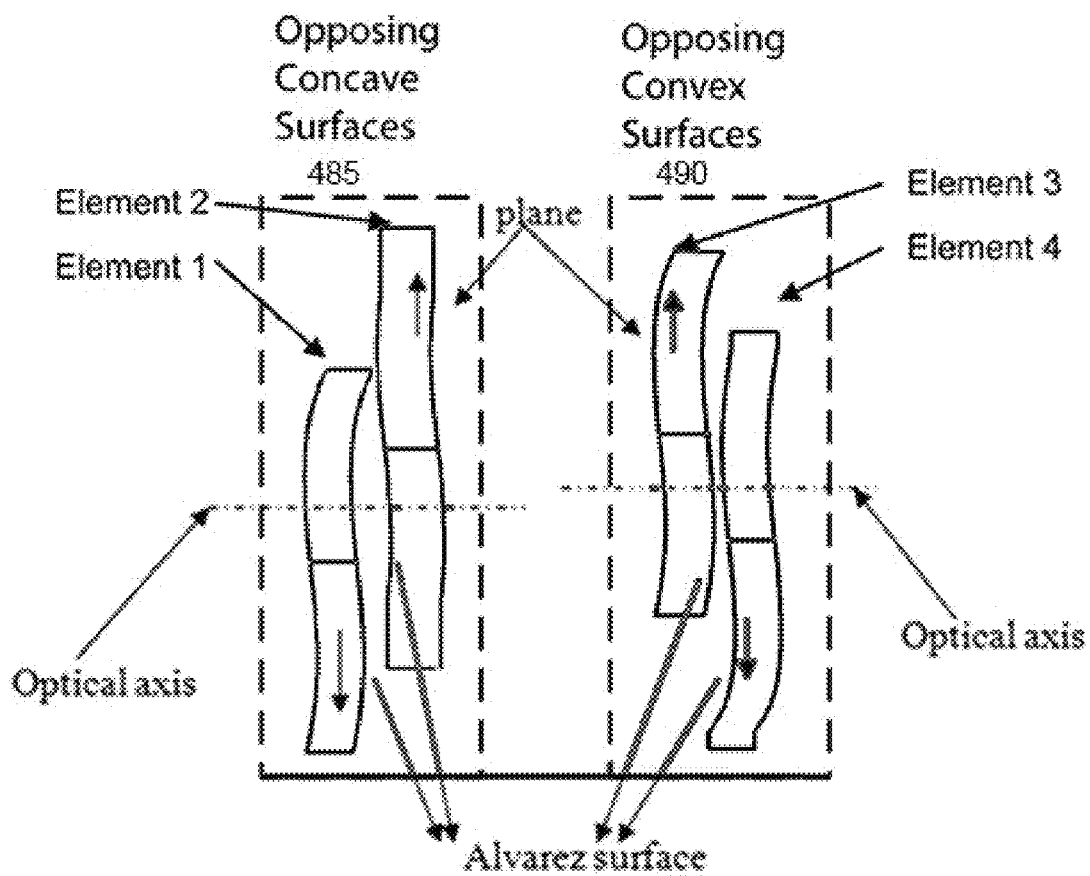
FIG. 4D illustrates a modified Alvarez pair in which both sides of each Alvarez pair are rotationally asymmetric and defined by an appropriate polynomial.

Importantly, and as discussed in more detail hereinafter in connection with FIG. 18, in an embodiment suitable for use in lens modules appropriate for cell phones, the lateral translation necessary to move the lenses from the wide angle position to the zoom position is only approximately two millimeters, while achieving a magnification of 3:1. This relatively short stroke permits low power operation, with low acoustic noise, in addition to a desirably small form factor. In such an arrangement, the lenses typically range in size from four to ten millimeters, depending on the form factor desired and the size of the sensor. In other arrangements, different lens sizes will be appropriate. In addition, in some embodiments, the Alvarez lens pairs can have rotationally asymmetric surfaces on both sides of each lens in the pair, such as shown in FIG. 4D with lens pairs 485 and 490, where each surface of each lens in both pairs is defined by an appropriate high-order polynomial. It will be appreciated, given the teachings herein, that in some embodiments not all of the surfaces will be rotationally asymmetric. FIG. 4E illustrates a system in which a first Alvarez pair 400' is free form on all four surfaces. Light passes through the pair 400' and then through a prism 405A to bend the light path. The prism can, depending upon the embodiment, be either glass or plastic, although some glass prisms will offer better aberration characteristics than plastic prisms. The light then passes through a second Alvarez pair 410', again with all four surfaces being rotationally asymmetric. In some embodiments, an additional lens can be interposed between the prism 405A and the pair 410' to provide image stabilization. After the pair 410', the incoming light passes through a base lens 415'. The base lens 415' assists with focusing, and can comprise one or more lenses, for example four or five. Those lenses can, depending upon the embodiment, be designed to move together or to move separately. Light passing through the base lens is thus focused on a sensor 420', either directly or after passing through a second prism 405B. The second prism can be used in embodiments where low Z height is desired, while still permitting the use of larger sensors, for example ½" sensors offering, for example, sixteen megapixels.

Referring next to FIG. 5, an embodiment of the dual coil actuators which cause the relative movement among the Alvarez lenses can be better appreciated. In FIG. 5, lens set A, indicated at 500, is affixed to dual coils 510 shown at the left and connected in series. The coils 510 are positioned between three permanent magnet pairs 515. Similarly, lens set B, indicated at 505, is affixed to dual coils 510 shown at the right and also connected in series. A magnetic shield 520 (FIG. 2A) surrounds the magnets and coils to prevent leakage of magnetic flux. By applying a current to the coils 510, a Lorentz force is generated, and the lens sets move as indicated by the arrows on either side of the coils 510. In some embodiments, a compression spring is included to balance the Lorentz force, such that the spring automatically returns the lens sets to a rest position when current is removed from the coils. In other embodiments, the current is applied in opposite polarities to move the lens sets bidirectionally. In an embodiment, one vertical leg of the coil conductors is maintained in one magnetic polarity zone whereas the return resides in the opposite polarity. Also, as noted in connection with FIGS. 2A-2D, in an embodiment, one lens from each pair moves together, typically in either the 1-3, 2-4 configuration or the 1-4, 2-3 configuration, although numerous other configurations are possible as discussed above in connection with FIGS. 2A-2D.

Referring next to FIG. 6, the subassembly 210 (FIG. 2A) can be better appreciated. In particular, arm 600 provides a lens frame 605 into which the first lens (not shown in FIG. 6) is mounted by conventional means. A slot 610 is integrated into the arm 600 to permit either subassembly 230 or subassembly 240 to be affixed to subassembly 210, depending on whether a 1-3, 2-4 or a 1-4, 2-3 configuration is preferred. The slot 610 may not be necessary for other configurations. On the underside of the arm 600, a pair of coils 510 is mounted, typically using either adhesive or overmolding techniques. In an embodiment, and typical of the parts shown in FIG. 2A other than the lenses themselves and the coils and magnets, the arm and lens frame are integrated and formed in a unitary manner, such as by injection molding of materials well known within the art. The novel processes for molding such materials is described in greater detail in International Application PCT/IB2013/002905, assigned to the same assignee as the present application and incorporated herein by reference.

Referring next to FIG. 7, the balancing of magnetic structure with air gap can be better appreciated. The objective of the VCM's of the present invention is to be able to move the optics smoothly and accurately, which requires that the VCM's be able to generate sufficient Lorentz force to overcome the weight of the associated subassembly, plus friction, regardless of the position of the host device, for example a smart phone. In addition, the VCM is typically required to meet the full stroke requirement with minimal degradation across the stroke plane. Still further, it is desirable for the actuation mechanism to support some level of holding force at a stop or latch position in the absence of current through the coils. In some embodiments of the present invention, only a single coil may be implemented. However, the dual coil design discussed above and illustrated in FIG. 7 offers more efficient use of the magnetic flux available from the magnets 515. More specifically, the dual coil arrangement permits the use of an increased number of turns of wire on the coils without the disadvantage of increased air gap that is normally associated with an increased number of turns, since the magnets must be farther apart. As shown in FIG. 7, where a five mm scale is illustrated, the coils 700 can be seen to be relatively thin with respect to the magnets. In contrast, the coils 710 and 720 are larger (have more turns) and offer a greater Lorentz force than coils 700. In addition, the VCM's for coils 710 and 720 include a latch mechanism, discussed hereinafter beginning at FIG. 11.

Referring next to FIGS. 8 and 9, the 1-3, 2-4 and 1-4, 2-3 configurations for moving the Alvarez pairs of FIGS. 2A-2D can be better appreciated. In FIG. 8, which depicts the 1-3, 2-4 configuration, the arms onto which lens one and lens three are mounted are affixed to one another, such that the VCM associated with subassembly 210 (FIG. 2A) moves both lens one and lens three. Similarly, the arms onto which lenses two and four are mounted are affixed such that the VCM associated with subassembly 220 (FIG. 2A) moves lenses two and four.

Figure 10:
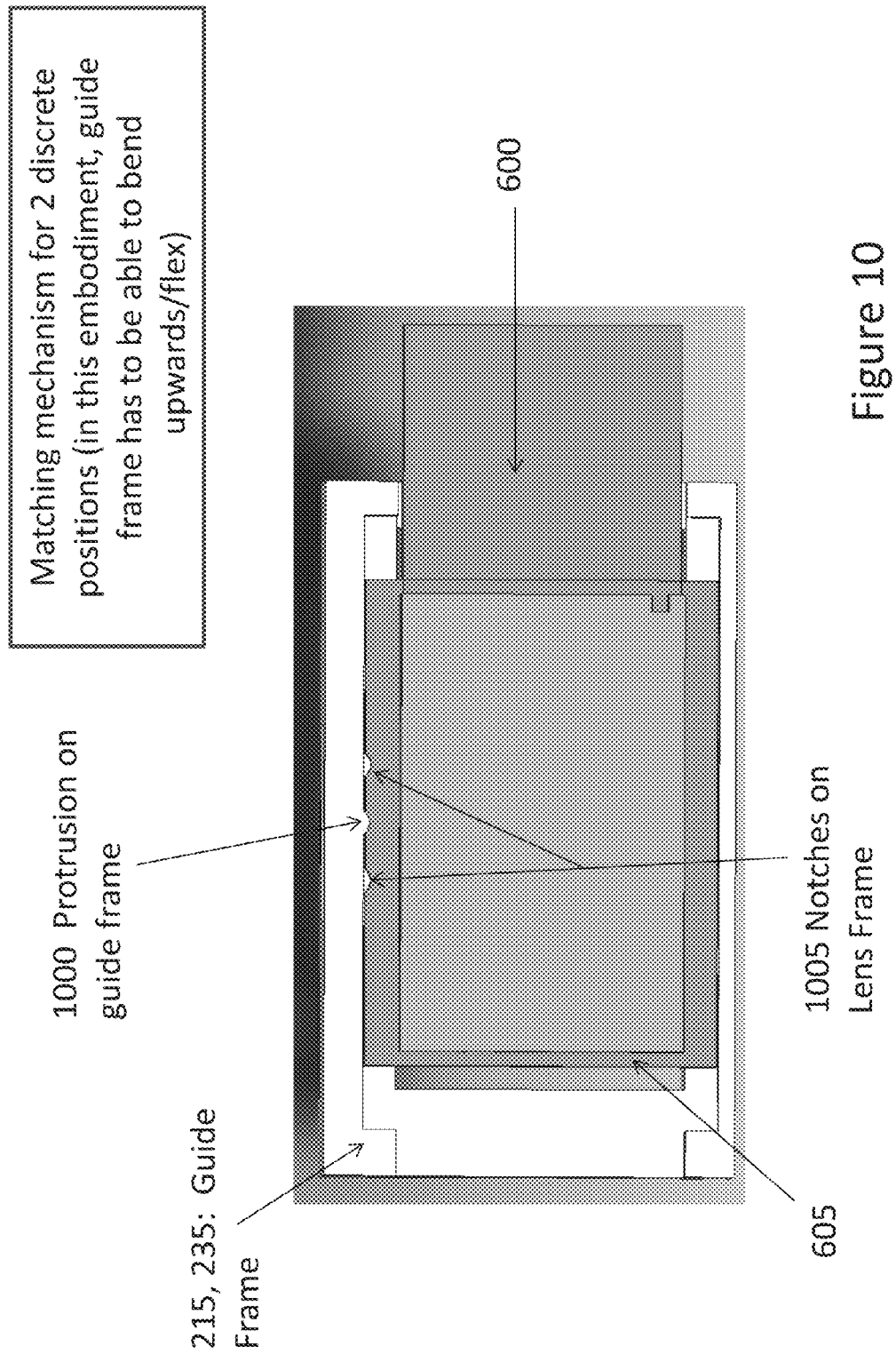
FIG. 10 shows an embodiment in which a mechanical stop or latch is created by the cooperation of a guide frame and its associated lens frame.

With reference next to FIG. 10, an embodiment of the lens frame and guide frame is shown in which mating protrusions and notches permit a latching or stop position. In particular, a protrusion 1000 on the guide frames 215 or 235 mates with one or multiple notches 1005 on lens frame 605, providing mechanical latch points along the stroke of arm 600. By providing two notches 1005, two latch positions exist. For example, one latch position can be at wide angle, while the other latch position is at full zoom. However, to implement such a design, the guide frame, or at least the protrusion 1000, is required to flex or bend sufficiently to permit the lens frame to move past it in accordance with the applied Lorentz force. It will also be appreciated that the location of the protrusions and notches can be reversed, such that the protrusions are on the optical component portion.

An embodiment offering a magnetic latch approach is illustrated in FIGS. 11 and 12, where FIG. 11 is a cutaway top view and FIG. 12 is a sectioned side view. As shown in FIG. 11, a latch magnet or ferromagnetic pin or plate 1100 is affixed to the associated coil 510 and is positioned proximate to a gap 1105 in the magnetic shield 520. The gap 1105 is sized to represent all or a portion of the stroke of the VCM. In a first position, the magnet 1100 is at one side of the gap 1105, while in a second position the magnet 1100 is at the opposite side of the gap 1105. As shown with FIG. 11, the latch pin or magnet can be positioned to latch at the extreme ends of the VCM stroke, or at only a single end, or somewhere in between. However, in some embodiments, a large initial current must be applied to the coils 510 to move the actuator out of the latch position. As an additional feature, an algorithm can be implemented in the processor module which, in the event of shock to the host device, causes the driver circuit to move the actuator to a latch position.

Referring next to FIG. 13, an embodiment is illustrated in which the guide frame 1300 can be configured to provide a two-position mechanical stop for designs which use magnetic latching. In particular, the guide frame 1300 receives the lens frame and lens(es) 1305. At either end of the guide frame 1300 are stops 1310 and 1315, which provide a mechanical "stop" to the travel of the arm 600 [FIG. 6]. In addition, to reduce friction by reducing the contact surface, bumps or protrusions 1320 can be provided on the guide frame 1300 or on the arm 600.

With reference next to FIGS. 14A-14B, two different designs for a discrete position magnetic latch are shown, suitable for implementation with the double coil VCM embodiments discussed above. In FIG. 14A, gap 1400 extends across both coils, and two latch magnets or pins 1100 are used in the manner discussed in connection with FIG. 11. In FIG. 14B, gap 1400 extends only across a single coil and only a single latch magnet or pin 1100 is used.

FIG. 15 illustrates an alternative embodiment for a magnetic latch, in which a pair of small coils 1500 is positioned within the housing 1510 in locations representing latch points along the travel of the arm and lens holder 600. In the embodiment shown, a single magnet or pin 1100 is positioned on the arm 600. When an appropriate one of the coils 1500 is energized, the magnet is attracted to the coil and the arm is latched at one of the two coil positions. If a magnet is used for the pin 1100, this embodiment also has the advantage that a reversal of the current can repel the magnet so that no extra Lorentz force is needed to overcome the latching force.

FIG. 16 illustrates an embodiment which provides a plurality of discrete latching locations, in which a plurality of gaps 1600, for example four, are formed in the shield 520. A plurality of latching magnets 1605, three in the illustrated example, is positioned under the associated coil 510, such that, as a Lorentz force of appropriate magnitude and duration is applied, the coil moves from gap to gap.

FIG. 17 illustrates a still further alternative embodiment for positioning of the zoom actuator across the full stroke, which offers the option of essentially continuous zoom rather than the incremental, discrete zoom having only a few fixed locations offered in other embodiments. More specifically, a position sensor 1700, such as a Hall Effect sensor or inertia sensor, is located on the assembly housing 520. Positioned proximate to the position sensor 1700 is a magnet 1705. As the arm 600 travels within the guide frame 215, the sensor 1700 is monitored in a closed loop arrangement, which permits positioning of the arm at substantially any selected position throughout its stroke. For example, if the output of the sensor is 8 bit data, 256 positions are possible, and for 10 bit data, 1024 positions are possible. The number of possible positions is limited only by the lower of the number of signal steps available in the output, and the number of sensor steps that can be read. For such a large number of increments, the user perception is that the zoom is continuous.

In such an embodiment, each position sensor is calibrated after the assembly process, and throughout the travel range. The calibration data is stored in the driver circuit or other convenient location within the host device. Closed loop control using the position sensor 1700 can be, for example, implemented within the driver circuit, or can be part of a software layer within the controller of the host device. In embodiments where motion control is used, the changing weight of the structure, as the camera is tilted or rotated, is preferably taken into account in the closed loop processing. A mechanical or magnetic latch can also be used in some embodiments that implement motion sensing, to provide shock protection or reduce power consumption, or to maintain position when at rest.

It will also be appreciated that position sensing can be used to calibrate the positions of the lens elements to adjust for any degradation in image quality introduced by manufacturing tolerances. By adjusting the lateral position of the lens pairs during calibration, optimum position data can be stored in the driver circuit or other data storage location in the device, and applied to the lens module as power is applied.

In an embodiment in accordance with the present invention, 3× zoom has been achieved in less than 0.2 seconds using a 2 mm lateral displacement substantially perpendicular to the optical axis, with a moving mass of 0.2-0.3 grams. The Lorentz force applied to achieve such results is in the general range of 10-50 milliNewtons, depending on the amount of applied current. The applied current necessary to achieve such force is less than 120 milliamps, at a power of approximately 0.1 watts. In such an embodiment positional accuracy is within 30 μm without a position sensor, and within 10 μm with a position sensor operating closed loop. In addition, such operation is performed at acoustic noise levels of less than 25 dBA.

Referring next to FIG. 18, another aspect of the invention can be better appreciated. From FIGS. 4A-4C, the effects of lateral movement of the lens elements of the Alvarez pairs can be appreciated. In addition to the lateral movement, the gap between the lenses can also be important in some embodiments. In large systems, the effect of this gap may be small due to the gentler surface profile. A gentle slope minimizes the deviation of the ray as it travels between the two optical surfaces. However, as the optical system and lens diameter size reduces, this approximation becomes less accurate. Both the optical power and the lens' travel distance affect the overall slope of the freeform surfaces. As the gap increases, the deviation of a ray's pass it travels through the gap increases. This deviation is undesirable in analyzing the approximate model of the system.

On the other hand, there is a limit to how small the gap can be. Optical power, displacement of motion of lens, the effective aperture of system all affects the slope of the freeform surfaces and therefor how close two surfaces can be placed in operation. With an undulating freeform surface, it is also likely that as the lenses moves transversely, contact might occur around the lens surface. Miniaturization for a small form factor also restricts the optical configuration. The optical powers for the tunable lenses are limited in order to achieve the optimal image quality within the space constraints.

Consider a set of Alvarez-like surfaces as shown in FIG. 18(*a*). The first and second lens elements have thicknesses (measured in the direction of the z-axis) described respectively by the following equations:

$$z(x,y)=A(\tfrac{1}{3}x^3+xy^2) \quad (1)$$

The thickness of each lens is given by $$t_1(x,y)=z(x,y)+C=A(\tfrac{1}{3}x^3+xy^2)+C \quad (2)$$

$$t_2(x,y)=z(-x,y)+C=-A(\tfrac{1}{3}x^3+xy^2)+C \quad (3)$$

The total thickness of both lenses is then $$\begin{aligned}T(x,y) &= t_1[(x-\delta),y]+t_2[(x+\delta),y] \\ &= z[(x-\delta),y]+z[(x+\delta),y]+2C \\ &= -2A\delta(x^2+y^2)-\tfrac{2}{3}A\delta^3+2C\end{aligned} \quad (4)$$

$$\varphi = 4A\delta(n-1) \quad (5)$$

Where A and C are constants, x and y are transverse coordinates normal to z, φ is the optical power. Here, we assume A is a positive constant. Clearly, the combined thickness of the two-element system is then t=t1+t2=2C, which is equivalent to a parallel plate. It can been shown that when the first element moves a displacement δ and the second moves −δ along the x direction, the combined thickness t has a parabolic term −2Aδ(x2+y2) thus emulating a converging lens for positive displacement δ and a diverging lens for negative δ. Where n is the refractive index of the lens material. FIG. 2 shows the effective overlap as each lens moves a displacement δ.

Assume the gap between the two freeform is t, and Δ is the distance between the two freefrom surface within the effective aperture D.

$$\Delta = z(x,y+\delta)+t-z(x,y-\delta)$$

$$= 2A\delta\left[(x^2+y^2)+\tfrac{1}{3}\delta^2\right]+t$$

$$x^2+y^2 \le \left(\tfrac{D}{2}\right)^2$$

In order to avoid collision during the movement of the lenses, we have the condition where

Δ>0, that is, the lenses must not touch.
If we assume D≫δ, then we can establish a condition as:

$$\begin{aligned}t &= \Delta - 2A\delta\left[(x^2+y^2)+\tfrac{1}{3}\delta^2\right] \\ &\approx \Delta - 2A\delta(x^2+y^2) \\ &= \Delta - \frac{\varphi D^2}{8(n-1)}\end{aligned} \quad (6)$$

$$t > \frac{|\varphi|D^2}{8(n-1)}$$

There are two basic requirements for zoom lenses in imaging systems such as cameras: adjustable focal length and fixed image plane. In order to meet the two basic requirements, two pairs of Alvarez-like lenses are required in a zoom lens system. As shown in FIG. 2, we present a new design by combining two pairs of Alvarez lenses as variable-focus lenses and a fixed focus lens. The two pairs of Alvarez lenses can not only adjust the whole focal length of the system but also compensate the position changes of the image plane.

Assume that Alvarez lens pair equivalent to a thin lens, in order to keep the image plane fixed during the zooming, we have:

$$f_2 = \frac{-f_1 + d_1}{1 + (-f_1 + d_1)/k}$$

Where $f_1$ is the focal length of the first Alvarez lens pair, and $f_2$ is the focal length of the second Alvarez lens pair, k is a constant, $d_1$ is the distance between the two Alvarez lens pairs.

The focal length of the whole system is:

$$f = \frac{f_1 \cdot f_2 \cdot f_3}{(d_1 - f_1 - f_2)(d_2 - f_2 - f_3) - f_2^2}$$

where f is the focal length of the whole system, $d_2$ is the distance between the second Alvarez lens pair and the fixed focus lens.

For a zoom lens used in mobile phone, the optical configuration as shown in FIG. 3, the system consists of two tunable lenses (tunable lens 1 and tunable lens 2) and a set of fixed-focus lenses, stop aperture was between tunable lens1 and tunable lens2. In order to keep the image plane at the same place during zooming, at wide angle, the optical power of the tunable lens1 is positive and the optical power of tunable lens2 is negative (as in FIG. 3(a)), at telescope end, the optical power of tunable lens1 is negative and the optical power of tunable lens2 is positive (as in FIG. 3(b)). When zooming from wide angle to telescope, the optical power of tunable lens1 ranges from positive to negative; on the other hand, the optical power of tunable lens2 ranges from negative to positive.

For the compact size requirement of the thickness of the mobile phone and pad, the zoom optical system has to be optically bent at least one time, as FIG. 4 shows.

Optical Power Distribution

The optical power of the whole system was determined by the size of the image detector (usually a CMOS or CCD) and the field angle.

Assume that φ1 and φ1 are the power of the first and second groups, respectively, and d is the principal distance between the first and second groups. The combination optical power of the two lenses is:

$$\varphi = \varphi_1 + \varphi_2 - d \times \varphi_1 \cdot \varphi_2$$

$$f \times \tan\theta = \frac{D}{2}$$

where f is the focal length, θ is the FOV angle and D is the diameter of the image circle.

$$\varphi = \frac{1}{f}$$

Assume the zoom ratio is 13, at wide angle end:

$$\phi_w = \phi_{1w} + \phi_{2w} - d\phi_{1w} \times \phi_{2w}$$

At telescope end:

$$\phi_t = \phi_{1t} + \phi_{2t} - d\phi_{1t} \times \phi_{2t}$$

Where d is the distance between first Alvarez lens pair and the second Alvarez lens pair.

$$\phi_w = \beta \times \phi_t$$

Within a limited space, the distances between lens pairs can only be constrained between 4 mm~8 mm.

To satisfy the imaging requirements of miniature camera modules, the optical power of Alvarez lens1 ranges from 0.3 (1/mm) to −0.3 (1/mm) (focal length ranges from 3.33 mm to infinity and infinity to −3.33 mm)

The optical power of Alvarez lens2 ranges from −0.3 (1/mm) to 0.3 (1/mm) (focal length ranges from −3.33 mm to infinity and infinity to 3.33 mm).

This set of ranges will satisfy the optical configurations of suitable for optical zoom modules that fit a cameraphone.

Example: for a ¼ inch CMOS, FOV is 64 degrees, zoom ratio is 3. At the wide angle end, the focal length is:

$$f_w = \frac{D}{\tan\theta} = \frac{2.265}{\tan 32} = 3.62 \text{ (mm)}$$

At telescope end, the focal length is:

$$f_t = f_w \times \beta = 3.62 \times 3 = 10.86 \text{ (mm)}$$

The consequence of these ranges is that the optimal gaps between the Alvarez lens pairs can be determined for a miniature system. From (6), for a focal length of 5 mm, aperture 2 mm and a material refractive index of 1.5, the gap has to be larger than 0.2 mm to avoid interference during motion. For the largest optical power considered (0.3 mm$^{-1}$) at aperture size of 2.5 mm, we can determine the optimal range of the gap between each pair of lenses to be 0.2 mm<gap<0.5 mm Reducing optical aberrations can be achieved through utilizing higher order terms in the polynomial equations of the freeform surfaces. Chromatic aberrations is reduced more through the material configuration and selection. One means of achieving so is to have a lens being made up of two materials of different Abbe number (FIG. 22). This lens can be fabricated through injection molding two lenses separately and bonding them together as an assembly process. The relative similarity in the refractive index of both materials minimizes the optical errors introduced at the interface. Another method is molding one side of the lens first and molding the other surface directly on the pre-molded part. The lenses described herein can be fabricated from optical quality cyclo olefin polymer, for example Zeonex, or can be fabricated from polycarbonate or polystyrene, or low dispersion glass. It will also be appreciated, from the teachings herein, that, in some embodiments, one material can be used for one lens, and another for a different lens, or for the prism shown in FIGS. 4A-4B. It will also be appreciated that a lens can be comprised of two different materials bonded together, as discussed above in connection with FIG. 22. Typically, lenses for cell phone camera embodiments range in size from four to ten millimeters, although other applications, such as security cameras and the like, can be larger.

Referring next to FIGS. 23-28, an alternative embodiment of a lens system with actuator suited for use in cell phones or other miniaturized applications can be better appreciated. With reference to FIG. 23, the lens system or module can be seen to include a free form lens assembly 2300 which mates to a base lens assembly 2305. The base lens assembly includes a sensor bracket 2310 upon which a sensor can be mounted. An FPC cover 2320 is fitted over the paired assemblies 2300 and 2305, and a metal cover 2315 fits over the top of that combination. An inlet opening or inlet window can be provided in the cover 2315, and an opening for placement of the sensor can also be provided.

The free form lens assembly can be appreciated in greater detail from FIG. 24, in which a pairing of lenses 1 and 4 is mounted on a single armature and thus forms lens group 2400. In some instances the lenses are molded with the armature in a unitary fashion. Similarly, a second pairing of lenses 2 and 3 is mounted together as lens group 2405. The lens groups are ultimately mounted, in a movable relationship, on a base 2410, by means of guide rod receivers 2415, 2420 and 2425. Some aspects of the receivers can be better appreciate from FIG. 25, in which the lens armatures are seen inverted to show the relationship between the receivers and guide rods. More specifically, the guide rod receivers 2415 and 2420 have an orifice through which one of the guide rods passes, while the receiver 2425 comprises a smooth slot through which the second guide rod passes.

The relationship between the receivers and the guide rods can be seen to be a three point support for the lens armature, which, while not required in all embodiments, helps to substantially reduce tilt, as discussed in greater detail hereinafter. The guide rods are glued or otherwise rigidly affixed to guide rod supports 2435 and 2440. Electric coils 2445 and associated printed circuit boards on the base mate with permanent magnets 2450 mounted on armatures of the lens groups 2400 and 2405. The magnets and coils interact to extend or retract the lens groups with respect to one another in a direction substantially perpendicular to the optical axis of the pairs, while maintaining sufficient alignment with a prism 2455 that light passes onward to the base lens. A metal strip 2460 can be placed on the base such that the permanent magnets on the lens groups interact with the strip 2460 to provide a magnetic latching action, explained in greater detail hereinafter in connection with FIG. 27.

FIG. 26 illustrates in exploded perspective view a base lens in accordance with an aspect of the invention. In particular, a base lens comprises a base 2600, base lens barrel 2605, one or more base lenses 2610, prism and prism holder 2615, optional IR filter 2620, sensor bracket 2625, sensor 2630, magnets 2635 with mating electric coils and printed circuit boards 2640, a pair of base guide rods which fit into base lens receivers 2650, and guide rod mounts 2655. Similarly to the freeform lens assembly described above, the coils and magnets interact when power is applied to move the base lens barrel, into which at least some of the base lenses are mounted, so as to focus light received from the freeform subassembly into an image on the sensor.

Referring next to FIG. 27, an embodiment of a magnetic latch useful in conjunction with the freeform and base lens subassemblies described herein can be better appreciated. In particular, a metal strip 2455 is positioned on the base 2410. As the magnets and coils interact to move the lens group along the guide rod, the end of the lens group nearest the metal strip is biased downward due to the attraction of the magnets to the metal strip. Conversely, the opposite end of the lens group is driven slightly upward. If left unaddressed, these forces would result in sufficient tilt to cause unacceptable distortion of the image. However, by providing two guide rods, one on either side of the lens group, and three receivers split two on one side and one on the other, tilt can be substantially reduced in three dimensions. With lens and related elements having dimensions as described herein, the approach described above is capable of reducing tilt to +/−0.2 degrees for freeform lenses, and +/−0.1 degrees for base lenses.

A related issue, in some ways the converse, is stiction: to provide a good customer experience, the movement of the lens groups along the guide rods must be smooth and reliable. At the same time, there needs to be very little free play with the orifices that the guide rods pass through. To assist in this, the orifices are relieved through a part of their opening, as best seen in FIG. 28, where a small flat area 2800 is provided on one or more sides. This provides a smaller contact zone than the entire orifice, allowing reliably smooth movement of the lens groups or base lenses along the guide rods.

Figure 29A:
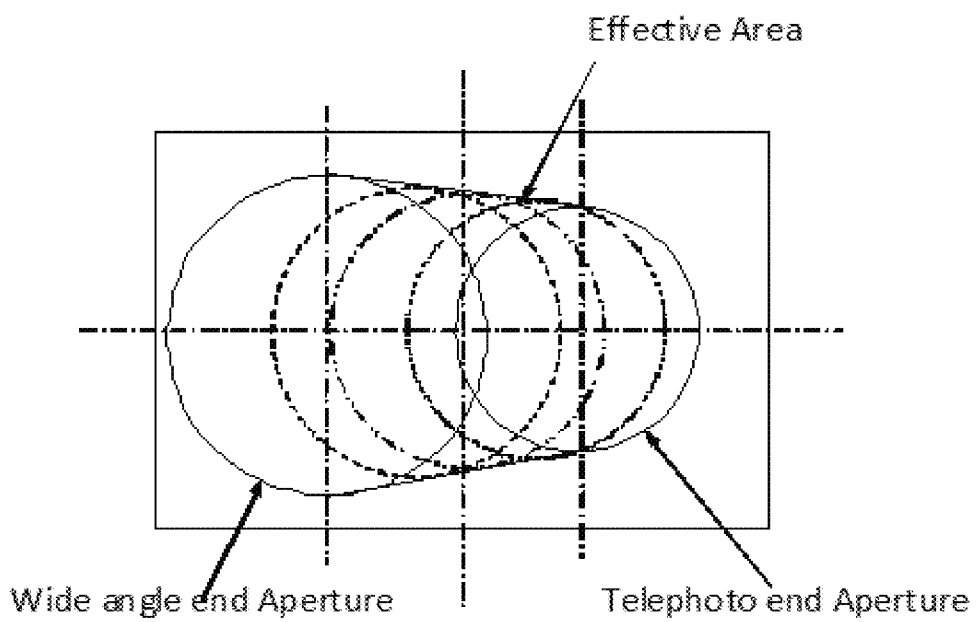
FIGS. 29A-29D illustrate the active optical area of an Alvarez pair at various positions, and techniques for improving lens manufacturability by modifying the lens profile.
Figure 29B:
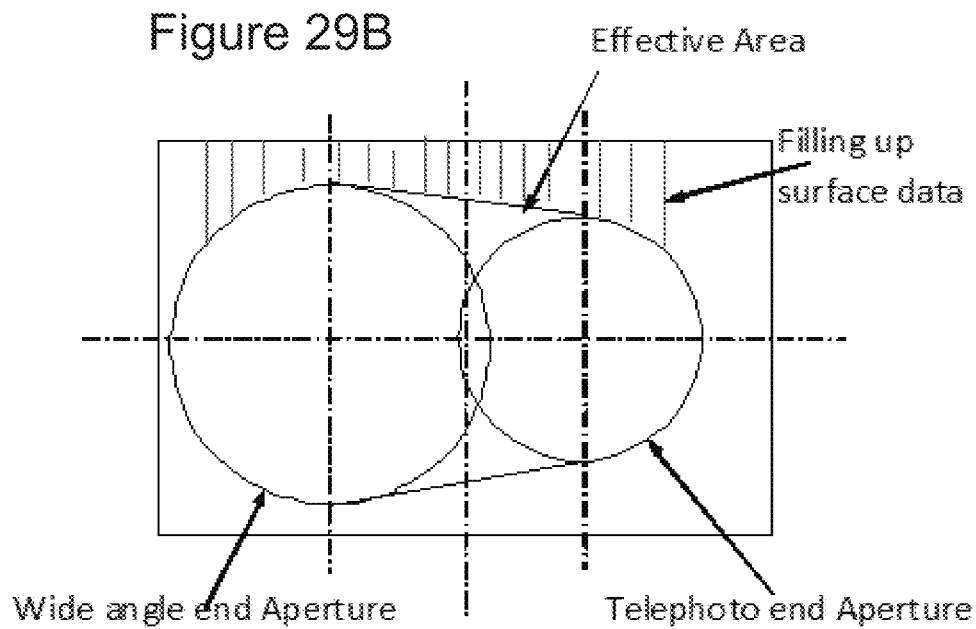

Referring next to FIGS. 29A-29D, techniques for improving manufacturability of rotationally asymmetric lenses in accordance with the invention can be better appreciated. In general, the active area of a single Alvarez element does not encompass the whole lens area, as shown in FIG. 29A. The unused regions can result in very steep profiles that are difficult to manufacture and may create interference between lenses during lateral movement. It is therefore desirable to adjust these regions in a manner that removes the potential interference between lenses and also ensures ease of manufacturing.

One possible method is to track the circumference of the active area and fill the unused region with the surface profile with the value of the nearest proximity to the circumference. For example, one way is to fill the surface profile with the same value along the x-axis of the circumferential value of the active area, as illustrated generally in FIG. 29B.

Figure 29C:
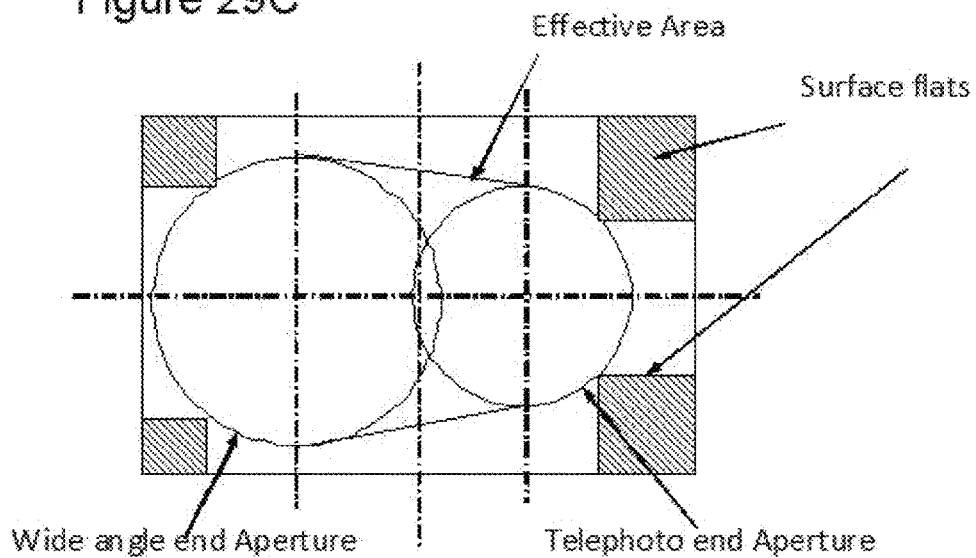

Additional steps can be made to create a more manufacturable surface. In the above example, the surface may still result in very steep profiles at the edge of the circle tangential to the axis along being compensated. A related issues is that it is desirable to have a means to check the alignment of the lenses during fabrication and during assembly. To solve both of these issues at the same time, it is useful to find the lowest or highest point along the unused region and fill the rest of the region with that value. This will create flats at the four corners of the lens area, as shown in FIG. 29C.

Figure 29D:
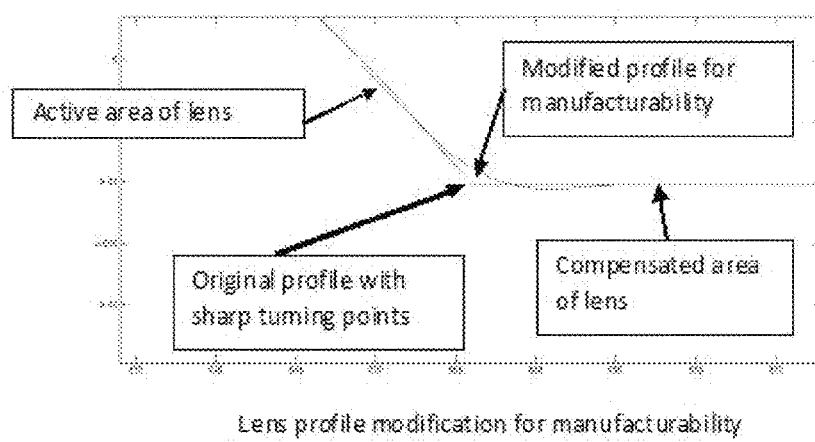

Further work can be done to aid manufacturability. The transition between the active area and compensated area can be smoothed with a gradual change of a linear or polynomial function. This has the benefit of removing sharp changes in surface gradients which could present manufacturing challenges, as shown in FIG. 29D.

Other challenges posed by the use of freeform lenses include difficulties in alignment and measurement because freeform lenses lack an optical center. An associated challenge is the need to identify undesirable rotation during assembly. These challenges can be overcome by molding alignment features into the lens body, and thus using the lens body or armature as a lens datum. These features, for example lenses, grating lines, or slopes, can then be measured optically or mechanically to assist in checking for lens alignment.

Figure 30A:
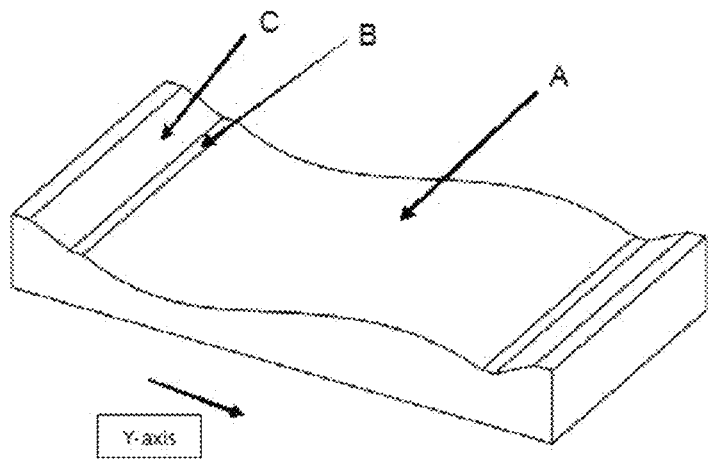

It is difficult to accurately position the freeform lens along the Y-axis since the whole surface has to be profiled and compared to the theoretical data to ascertain position. One technique to overcome this is to create a planar (B) and a sloped (C) surface that can be profiled in a single scan, such as the design shown in FIG. 30A. On the sides of the freeform surface, additional sloped and flat reference areas can be molded together with the lens. Molding does not create a sharp intersection line between the slope and flat surface, thus both the sloped and the flat areas have to be profiled together. However, the theoretical position of the intersection with respect to all of the freeform surface points along the Y-axis is known. By profiling the slope and the flat, the intersection can be found through calculation.

Figure 30B:
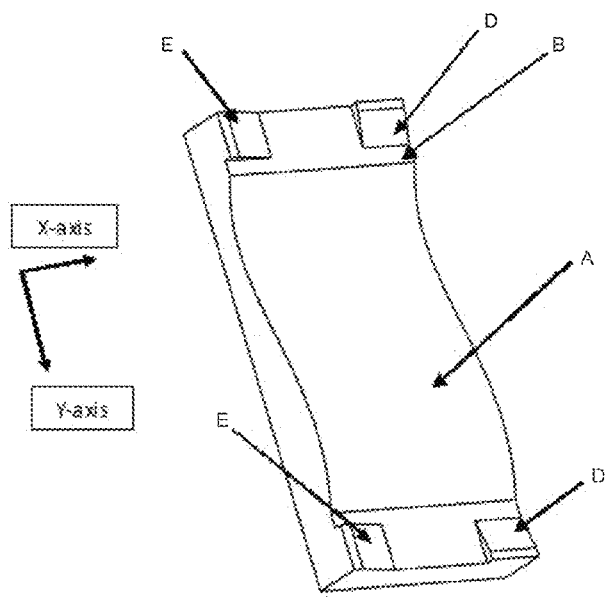

Another variation is to map the X or Y-axis positions onto Z-height, again using the slope feature such as shown in FIG. 30B. To determine the position of the freeform lens along the X-axis, feature "E" is used. The Z-height of the slope, when measured accurately, can be used to determine the actual X-axis position along the lens surface. Similarly, feature "D" can be used to locate Y-axis positioning. With both "E" and "D", both X and Y axis positions of the freeform surface can be inferred.

FIGS. 30C and 30D show a comparison of a designed profile and a measured profile. In the measured profile, assume the coordinate of the measured points A1,A2, A3, . . . ,An,B1,B2,B3, . . . ,Bm are (Xa1,Ya1), (Xa2,Ya2), (Xa3,Ya3), . . . ,(Xan,Yan),(Xb1,Yb1),(Xb2,Yb2),(Xb3,Yb3), . . . ,(Xbm,Ybm)

Assume that the equation y=k1x+b1 denotes the line segment A'C', equation y=k2x+b2 denotes the line segment B'C'.

For line segment A'C':
Ya1'=k1Xa1;
Ya2'=k1Xa2;
Ya3'=k1Xa3;
. . .
Yan'=k1Xan;
A form of minimal error function is used to obtain the best fit line such that K1 and b1 are determined by $$f(k_1, b_1) = \min\left(\sqrt{\frac{\sum_0^n (Y_{an'} - Y_{an})^2}{n}}\right)$$

Similarly for line segment B'C':
Yb1'=k2Xb1;
Yb2'=k2Xb2;
Yb3'=k2Xb3;
. . .
Ybm'=k2Xbm;
K2 and b2 are determined by:

$$f(k_2, b_2) = \min\left(\sqrt{\frac{\sum_0^m (Y_{bm'} - Y_{bm})^2}{m}}\right)$$

The tilt angle of the scanned trajectory is:

$\alpha = \arctan(k_2)$

The angle of the slope is:

$\theta' = \arctan(k_1)$

Thus the coordinates of the crossing point of line segments A'C' and B'C' can be determined as:

$$X_{C'} = \frac{b_2 - b_1}{k_1 - k_2}$$

-continued $$Y_{C'} = \frac{b_2 k_1 - b_1 k_2}{k_1 - k_2}$$

Figure 31B:
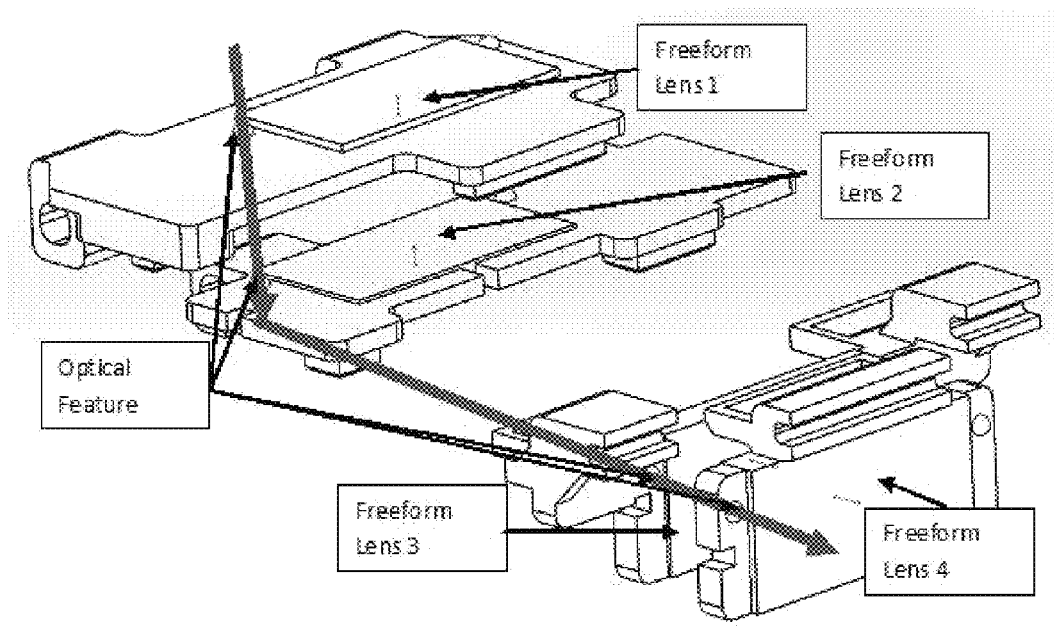

Referring next to FIGS. 31A-31D, in some embodiments it is possible to aid in alignment by fabricate optical features on the armature or lens frame at the same time as the freeform lenses are formed. These optical features can be lenses which can be aligned using traditional methods. In this way, the limitation of not having easily identifiable features on freeform surfaces can be overcome. As shown in FIG. 31A, optical features 3100 and 3105, such as a rotationally symmetrical lens, can be formed on the lens frames for freeform lens 3110 and 3115, respectively. To align the freeform lenses, each frame can have at least one of these lenses, in an aligned position relative to one another, and traditional alignment methods can be applied for alignment. For example, centering of rotational symmetric lenses can be done through a laser beam aimed to find the apex of the rotational lenses. A plurality of such lenses, for example up to three, arranged at various points on the lens frames, can offer additional improvement in alignment. Even using only a single optical feature per lens frame or armature permits aligned assembly of multiple freeform lenses, including alignment of configurations requiring the light path to be bent, as shown in FIG. 31B where four freeform lenses are shown being aligned by a single laser beam passed through the respective optical features. A more crude, less effective approach to alignment can, for some systems, comprise simply an orifice in the lens frame.

While the optical features assist in creating reference positions for the lenses, in subsequent operation, other reference positions can help in calibrating any position feedback sensor on the module. These position feedback sensors can include Hall sensors, capacitive sensors, piezo-effect sensors and linear encoders. For any sensor, calibration is a necessary step to achieve high positioning accuracy. This calibration step entails referencing actual positions of the lenses with respect to the signals the respective sensors are measuring. For example, for Hall sensors, the lens frame can carry a magnet which, when moved together with the frame, creates a changing magnetic field that is picked up by a stationary Hall sensor mounted on the module housing. This changing magnetic field reflects a change in position of the lens frame.

Figures 31C, 31D:
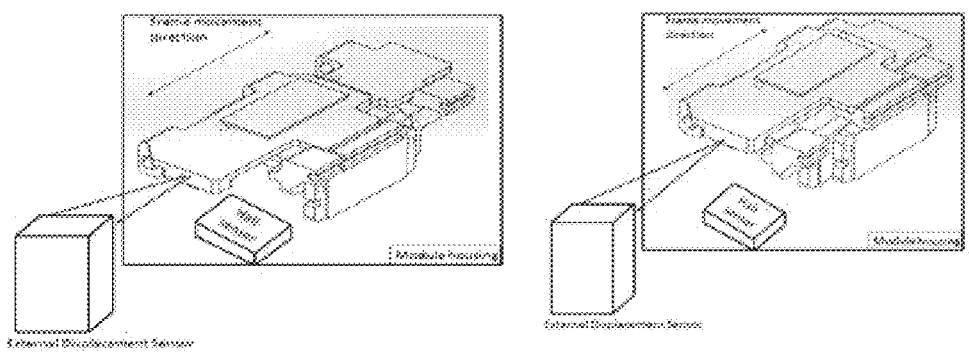

The calibration allows the sensor to recognize the magnetic field signal it should sense with respect to the desired position of the frame. This actual position input has to be obtained from external means. Relative initial positions between the frames can be ascertained with the alignment marks described earlier. From these relative initial positions, subsequent positions of the lens frame can be obtained using an external displacement measuring tool like a laser displacement sensor. In that way, the magnitude of the magnetic field picked up by the Hall sensor at various positions of the frame can be correlated to the frame's positions. An example of the measuring process is illustrated in FIGS. 31C and 31D. At the initial reference position, the Hall sensor signal can be recorded. From the figure on the left, a laser displacement sensor can be used to measure on a part of the lens frame to obtain its position. By moving the frame to various positions as necessary, each positions' hall sensor reading can be tabulated with known position values.

A single lens alignment feature on each frame allows alignment in the X, Y, Z axes as well as rotation in the X and Y axis. Only the Z axis (about the axis of symmetry of the lens) cannot be determined. Utilizing two lens alignment features in each frame fully determines the frame position. More lens alignment features can be added with diminishing effectiveness.

Each of the lens alignment features can range between 0.1 mm to 10 mm, depending upon the implementation and its application. Smaller lens sizes can, in at least some instances, be associated with smaller alignment features. The limitations of smaller lens sizes revolve around the ease of focusing or collimating the laser beam and the amount of signal intensity that can be obtained to be effectively used.

Maximum gradient of the freeform surfaces will be less than 60 degrees for lenses about 4 mm diameter or diagonal. As lenses becomes larger to say 10 mm diagonal, the expected profile gradient can be decreased to less than 40 degrees.

Suitable image sensor sizes can range from ½" to ¼" sensors within a 10 mm×40 mm×40 mm module footprint.

Freeform lenses, translating laterally to the optical axis, offer a compact way to deliver optical zoom and other features. To deliver optical zoom, the movement of the lenses have to be bi-directional and synchronized. One factor in delivering a low-cost solution is being able to reduce the number of actuators in the system. One way to achieve that is to reduce the number of actuators is to have a number of lenses connected together.

Assume the optical system consists of two lenses, one is G1 (Alvarez lens pair1), the other one is G2 (Alvarez lens pair2).

The optical power of whole system $\phi$ is:

$$\phi = \phi_1 + \phi_2 - d\phi_1\phi_2 \quad (1)$$

The working distance L is:

$$L = \frac{1}{\varphi}(1 - d\varphi_1) \quad (2)$$

Assume the travel range of the Alvarez lens from wide angle to telephoto is 2 mm, at wide angle end, the optical power of the two lenses are $\phi_{1w}$ and $\phi_{2w}$; at telephoto end, the optical power of the two lenses are $\phi_{1T}$ and $\phi_{2T}$; at random position, the optical power of the two lenses are $\phi_{1r}$ and $\phi_{2r}$;

At wide angle end, the working distance is:

$$L_w = \frac{1}{\varphi_{1w} + \varphi_{2w} - d\varphi_{1w} \cdot \varphi_{2w}}(1 - d\varphi_{1w}) \quad (3)$$

At telephoto end, the working distance is:

$$L_T = \frac{1}{\varphi_{1T} + \varphi_{2T} - d\varphi_{1T} \cdot \varphi_{2T}}(1 - d\varphi_{1T}) \quad (4)$$

At random position:

$$L_r = \frac{1}{\varphi_{1r} + \varphi_{2r} - d\varphi_{1r} \cdot \varphi_{2r}}(1 - d\varphi_{1r}) \quad (5)$$

At random position, the optical powers of each lens pair are:

$$\varphi_{1r} = \frac{\varphi_{1T} - \varphi_{1w}}{2} \cdot \Delta_1 + \varphi_{1w} \quad (6)$$

$$\varphi_{2r} = \frac{\varphi_{2T} - \varphi_{2w}}{2} \cdot \Delta_2 + \varphi_{2w} \quad (7)$$

While $\phi_{1w}$, $\phi_{1T}$, $\phi_{2w}$, $\phi_{2T}$, are the optical power of lens group G1 and G2 at wide angle end and telephoto end respectively. If we fix the freeform1 with freeform4 and freefrom2 with freeform3 together during the zooming, that means we must keep $\Delta_1 = \Delta_2 = \Delta$ during the zooming;

If we want to do the continuous zoom while keeping the working distance the same, as shown in equation (8):

$$L_w = L_T = L_r \quad (8)$$

$$\frac{1}{\varphi_{1w} + \varphi_{2w} - d\varphi_{1w} \cdot \varphi_{2w}}(1 - d \cdot \varphi_{1w}) = \frac{1}{\varphi_{1T} + \varphi_{2T} - d\varphi_{1T} \cdot \varphi_{2T}}(1 - d \cdot \varphi_{1t}) = \frac{1}{\frac{\varphi_{1T} - \varphi_{1w}}{2} \cdot \Delta + \varphi_{1w} + \frac{\varphi_{2T} - \varphi_{2w}}{2} \cdot \Delta + \varphi_{2w} - d\left(\frac{\varphi_{1T} - \varphi_{1w}}{2} \cdot \Delta + \varphi_{1w}\right)\left(\frac{\varphi_{2T} - \varphi_{2w}}{2} \cdot \Delta + \varphi_{2w}\right)} \left(1 - d\left(\frac{\varphi_{1T} - \varphi_{1w}}{2} \cdot \Delta + \varphi_{1w}\right)\right) \quad (9)$$

The above equation is valid only when $\Delta = 0$, or $\Delta = 2$.

The actuator system can be simplified through connecting the lenses in pairs. This can result in an optical zoom configuration with two discrete zoom points. This is the simplest configuration possible for such an optical zoom lens.

In some embodiments of the invention, particularly those providing greater than 3× optical power, it is desirable to be able to move separately each of the four lens elements that comprise two Alvarez pairs. While this entails additional complexity, as the above discussion shows, in some instances the additional complexity is a reasonable trade-off for the increased performance. Referring next to FIGS. 32A-34B, various actuators that achieve this independence of lens movement are shown. Such actuators must be able to provide one or more of the following characteristics: (a) Lenses 1 and 2 move the same distance but in different directions, while lenses 3 and 4 move the same distance as each other, but in different directions, and a different distance than lenses 1 and 2. (b) Lenses 1, 2, 3 and 4 all move different distances, although two are moving in the same direction as one another, and the other two are moving in the opposite direction of the first two. Desirable design characteristics are that these actuators must meet the form factor requirement of less than 6.5 mm Z height, they must displace the lenses at least 3 mm with a positional accuracy of 5 μm, they must have a sufficient number of stops to provide a good user experience, they must be cost effective, they cannot use excessive power, and they must be easy to manufacture and assemble.

FIGS. 32A-32D illustrates a rotating cam actuator that can move each of four lenses by a different distance, with two moving in opposition to the other two. FIGS. 33A-33B illustrate a linear motor driving a feeler cam which achieves the same result, while FIGS. 34A and 34B illustrate geared and friction wheel embodiments also capable of driving multiple lenses different distances, again with some moving one direction and an equal number moving the opposite direction.

Designs fabricated in accordance with the foregoing have achieved the following characteristics:

| Parameter | Freeform lenses | Base lenses |
|---|---|---|
| Surface Profile(PV) | <0.5 um | <0.3 um |
| Surface Decenter(X, Y) | +/−2 um | +/−2 um |
| Surface Tilt | +/−0.02 deg | +/−0.02 deg |
| Element to element de-centering | +/−5 um | +/−5 um |
| Thickness | +/−1 um | +/−1 um |
| Element tilt | +/−0.2 deg | +/−0.1 deg |
| Index | +/−0.00025 | +/−0.00025 |
| Abbe % | +/−0.25 | +/−0.25 |

Frame tilt (L-shape): +/−0.1 degrees
Sub-module assembly: +/−5 um
Prism (45 deg angle): +/−0.02 degrees
Prism assembly tilt: +/−0.1 degrees
Having fully described multiple embodiments of the invention, those skilled in the art will recognize that there are many alternatives and equivalents which do not depart from the scope of the invention. As such, the invention is not to be limited by the foregoing description, but only by the appended claims.

We claim:
1. An optical zoom lens system comprising
at least one microactuator configured to displace one or more optical elements,
at least four optical elements, each of the at least four optical elements configured for passage of optical signals therethrough along an optical signal travel path, each of the at least four optical elements comprising at least one free-form surface, each of the four supported in a lens frame comprising an arm, the optical zoom lens system further comprising a guide frame or frames,
wherein at least four of the optical elements are positioned in a pair-wise configuration such that a first and a second optical element, each mounted in their respective lens frame with a guide frame or a portion thereof between, form a first pair and a third and a fourth optical element each mounted in their respective lens frame with a guide frame or a portion thereof between, form a second pair, each of the pairs displaceable by displacement of their respective lens frame, in response to the at least one microactuator, relative to their respective guide frame or portion thereof between in a direction substantially transverse to the optical signal path to cause a change in optical power of the system.

* * * * *